US011496663B2

United States Patent
Takeuchi et al.

(10) Patent No.: US 11,496,663 B2
(45) Date of Patent: Nov. 8, 2022

(54) FOCUSING APPARATUS, IMAGE PICKUP APPARATUS, FOCUSING METHOD, AND STORAGE MEDIUM, WHICH CAN PROVIDE STABLE FOCUSING

(71) Applicant: CANON KABUSHIKI KAISHA, Tokyo (JP)

(72) Inventors: Kengo Takeuchi, Kawasaki (JP); Yohei Matsui, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/858,280

(22) Filed: Apr. 24, 2020

(65) Prior Publication Data
US 2020/0344406 A1 Oct. 29, 2020

(30) Foreign Application Priority Data
Apr. 26, 2019 (JP) .............................. JP2019-085658

(51) Int. Cl.
*H04N 5/232* (2006.01)

(52) U.S. Cl.
CPC ..... *H04N 5/23212* (2013.01); *H04N 5/23229* (2013.01); *H04N 5/232939* (2018.08)

(58) Field of Classification Search
CPC ......... H04N 5/23212; H04N 5/232939; H04N 5/23229; H04N 5/232122; H04N 5/232; H04N 9/04557
See application file for complete search history.

(56) References Cited

U.S. PATENT DOCUMENTS

| 5,694,625 | A | * | 12/1997 | Watanabe | ................ | G02B 7/28 |
| | | | | | | 396/102 |
| 2016/0227101 | A1 | * | 8/2016 | Iwasaki | ................ | H04N 5/3575 |
| 2016/0337579 | A1 | * | 11/2016 | Tanaka | .................... | G02B 7/09 |
| 2017/0034424 | A1 | * | 2/2017 | Uemura | ............. | H04N 5/23216 |
| 2018/0063415 | A1 | * | 3/2018 | Hongu | ............... | H04N 5/23212 |
| 2018/0109719 | A1 | * | 4/2018 | Nanu | ..................... | G03B 13/36 |

FOREIGN PATENT DOCUMENTS

| JP | 08-248510 A | 9/1996 |
| JP | 2001-188164 A | 7/2001 |

* cited by examiner

*Primary Examiner* — Luong T Nguyen
(74) *Attorney, Agent, or Firm* — Cowan, Liebowitz & Latman, P.C.

(57) ABSTRACT

A focusing apparatus includes a determination unit configured to determine whether an object is a moving object, and a focusing unit configured to perform focusing using information on driving of the focus lens generated based on the focus detecting signal in response to an operation of an operation unit. The determination unit determines whether the object is the moving object, using a first threshold before the operation of the operation unit, and using a second threshold different from the first threshold after the operation of the operation unit. The focusing unit performs first focusing that continuously performs the focusing when the determination unit determines that the object is the moving object before the operation of the operation unit, and performs the first focusing when the determination unit determines that the object is the moving object after performing second focusing that performs the focusing once.

18 Claims, 21 Drawing Sheets

PIXEL CONFIGURATION FOR NON-IMAGING PLANE PHASE DIFFERENCE METHOD

| R | Gr | R | Gr | R | Gr | R | Gr | R | Gr |
|---|----|---|----|---|----|---|----|---|-----|
| Gb | B | Gb | B | Gb | B | Gb | B | Gb | B |

FIG. 2A

PIXEL CONFIGURATION FOR IMAGING PLANE PHASE DIFFERENCE METHOD

FIG. 2B

N-TH FRAME (N+1)-TH FRAME

COMBINED VIEW

FOCUSING APPARATUS, IMAGE PICKUP APPARATUS, FOCUSING METHOD, AND STORAGE MEDIUM, WHICH CAN PROVIDE STABLE FOCUSING

BACKGROUND OF THE INVENTION

Field of the Invention

The present invention relates to a focusing apparatus, an image pickup apparatus, a focusing method, and a storage medium, each of which is applied to an electronic still camera etc. having a focusing function.

Description of the Related Art

The conventional camera has a so-called one-shot mode and a servo mode, each of which is selected depending on a motion of an object. For example, the one-shot mode is a mode mainly used for a still object to prohibit the lens from driving once the in-focus is obtained (AF lock state), while allowing the subsequent framing, if necessary. On the other hand, the servo mode is a mode mainly used for a moving object to continuously drive the lens in accordance with a change in the object distance, and to provide focusing in accordance with the motion of the object.

In order to assist a user unfamiliar with the camera in focusing, some commercialized cameras have recently included an automatic mode that switches between the one-shot mode and the servo mode in accordance with the motion of the object. Japanese Patent Laid-Open No. ("JP") 8-248510 discloses a camera serving to observe focus detection information of an object even in the one-shot mode, and to automatically change the setting to the servo mode when detecting the motion of the object. JP 2001-188164 discloses a camera that has a problem of inadvertently changing to the servo mode and a purpose of reliably determining the motion, monitors a visual line of a user operating the camera, determines an object based on a movement of the visual line, and detects a movement of an object area.

However, a smooth framing operation may be hindered when the servo mode is set in response to the detection of the motion of the object and the focus operation starts in the imaging standby or, for example, in setting a positional relationship between the object and the camera for framing. In addition, when a focus operation instruction, such as pressing an AF button, is issued for the imaging preparation and the object is once focused, and then the relative distance changes between the object and the camera and the focus is lost, the captured image becomes unclear. Moreover, once the object is in focus, the camera provides the user with a display or a sound notice that the object is in focus. It is difficult to recognize the in-focus timing after the servo mode is set because the motion of the object is always monitored. Therefore, it is not preferable to shift the focus operation to the servo mode just after the relative position changes between the object and the camera.

SUMMARY OF THE INVENTION

The present invention provides a focusing apparatus, an image pickup apparatus, a focusing method, and a storage medium, each of which can provide stable focusing.

A focusing apparatus according to one aspect of the present invention includes a determination unit configured to determine whether an object is a moving object, based on changes in an imaging signal and a focus detecting signal generated by photoelectrically converting an object image formed through an optical system including a focus lens configured to move along an optical axis, and a focusing unit configured to perform focusing using information on driving of the focus lens generated based on the focus detecting signal in response to an operation of an operation unit. The determination unit determines whether the object is the moving object, using a first threshold before the operation of the operation unit, and using a second threshold different from the first threshold after the operation of the operation unit. The focusing unit performs first focusing that continuously performs the focusing when the determination unit determines that the object is the moving object before the operation of the operation unit, and performs the first focusing when the determination unit determines that the object is the moving object after performing second focusing that performs the focusing once. At least one processor or circuit is configured to perform a function of at least one of the units.

Alternatively, the determination unit may determine whether the object is the moving object, using a first threshold before the operation of the operation unit, and using a second threshold different from the first threshold and the change of the focus detecting signal of a tracking area corresponding to the object after the operation of the operation unit. In addition, the focusing unit may perform first focusing that continuously performs the focusing when the determination unit determines that the object is the moving object before the operation of the operation unit, and may perform the first focusing when the determination unit determines that the object is the moving object after performing second focusing that performs the focusing once and a result of the second focusing shows an in-focus state.

An image pickup apparatus having the above focusing apparatus also constitutes another aspect of the present invention.

A focusing method according to another aspect of the present invention includes a first determining step of determining whether the object is a moving object using on a first threshold and changes in an imaging signal and a focus detecting signal generated by photoelectrically converting an object image formed through an optical system including a focus lens configured to move along the optical axis, before an operation of an operation unit, a first adjustment step of performing first focusing that continuously performs focusing using information on driving of the focus lens generated based on the focus detecting signal, after the operation of the operation unit, when the first determining step determines that the object is the moving object, a second adjustment step of performing second focusing that performs the focusing once using the information on the driving of the focus lens, after the operation by the operation unit, after the operation of the operation unit, when the first determination step determines that the object is not the moving object, a second determining step of determining, after the second adjusting step, whether the object is the moving object based on the changes in the imaging signal and the focus detecting signal and a second threshold different from the first threshold, and a third adjusting step of performing the second focusing using the information on the driving of the focus lens, when the second determination step determines that the object is the moving object.

Alternatively, a second determining step may determine, after the second adjusting step, whether the object is the moving object based on the change in the focus detecting signal of a tracking area corresponding to the object and a second threshold different from the first threshold.

A non-transitory computer readable storage medium storing a program that enables a computer to execute the above focusing method also constitutes another aspect of the present invention.

Further features of the present invention will become apparent from the following description of exemplary embodiments with reference to the attached drawings.

BRIEF DESCRIPTION OF THE DRAWINGS

FIGS. 2A and 2B illustrate a pixel configuration in an imaging plane phase difference AF.

DESCRIPTION OF THE EMBODIMENTS

Figure 1:
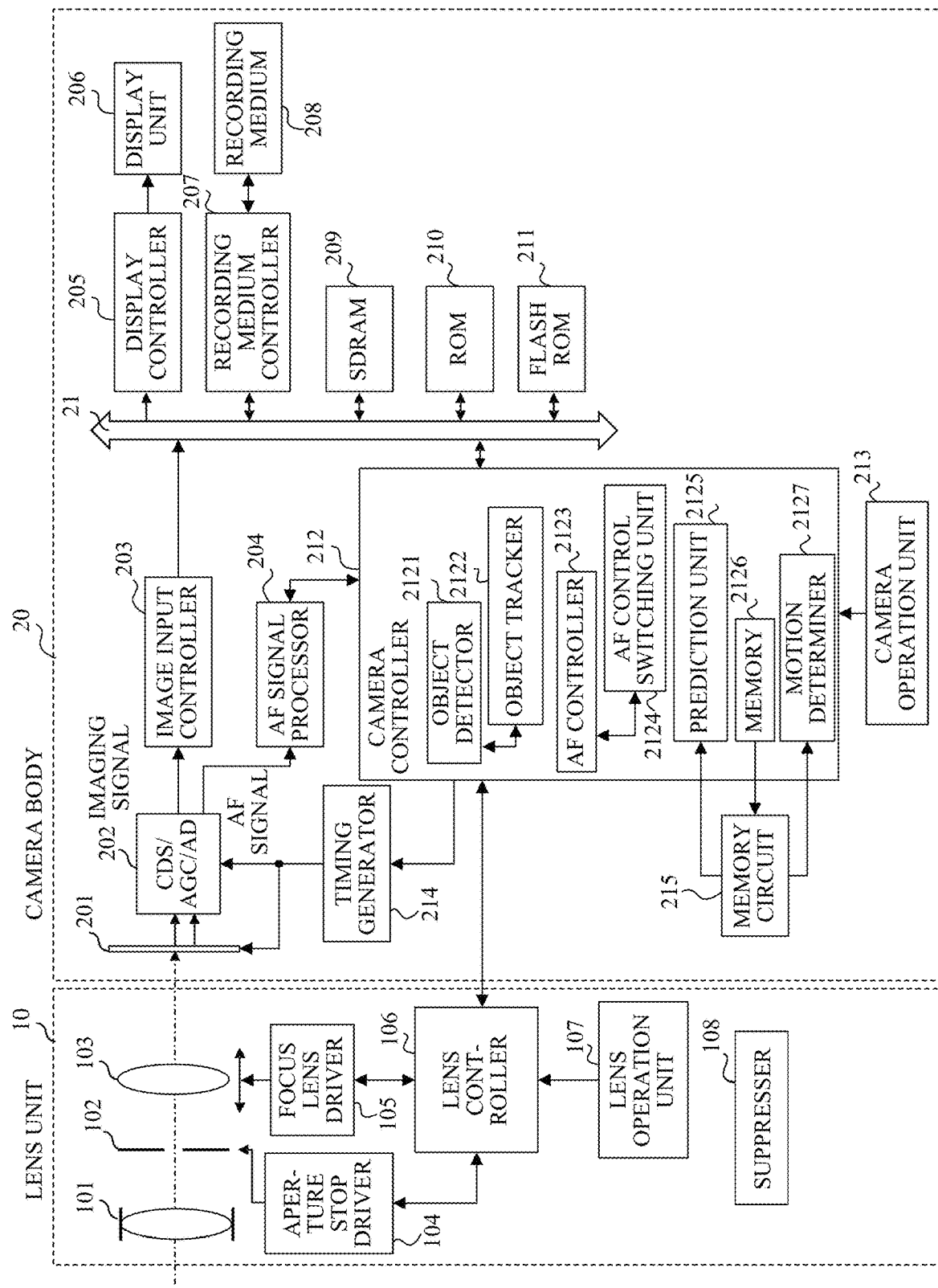
FIG. 1 is a block diagram of a lens interchangeable type camera system.

Referring now to the accompanying drawings, a detailed description will be given of embodiments according to the present invention. Corresponding elements in respective figures will be designated by the same reference numerals, and a duplicate description thereof will be omitted.

First Embodiment

FIG. 1 is a block diagram of a lens interchangeable type camera system (camera system hereinafter) as an illustrative image pickup apparatus according to one embodiment of the present invention. The camera system includes a lens unit 10 and a camera body 20. A lens controller 106 that governs operations of the entire lens unit 10 and a camera controller 212 that governs operations of the entire camera system including the lens unit 10 can communicate with each other through terminals provided on a lens mount.

A description will now be given of a configuration of the lens unit 10. A fixed lens 101, an aperture stop (diaphragm) 102, and a focus lens 103 constitute an image pickup optical system. The aperture stop 102 is driven by an aperture stop driver 104 and controls a light amount incident on an image sensor 201 described later. The focus lens 103 is driven by a focus lens driver 105 movably back and forth along the optical axis of the image pickup optical system, and the focal length of the image pickup optical system changes according to the position of the focus lens 103.

A lens operation unit 107 includes input devices for the user to make settings relating to the operations of the lens unit 10. The settings relating to the operations of the lens unit 10 include, for example, switching between the AF (autofocus) mode and the MF (manual focus) mode, adjusting the position of the focus lens 103 by the MF, setting an operation range of the focus lens 103, setting an image stabilization mode, and the like. When the lens operation unit 107 is operated, the lens controller 106 makes a control according to the operation.

The lens controller 106 controls the aperture stop driver 104 and the focus lens driver 105 according to the control command and control information received from the camera controller 212, and determines an aperture amount of the aperture stop 102 and the position of the focus lens 103. Further, the lens controller 106 transmits the lens control information to the camera controller 212.

Next follows a description of the configuration of the camera body 20. The camera body 20 can acquire an imaging signal from a light beam that has passed through the imaging optical system of the lens unit 10. The image sensor 201 includes a CCD or CMOS sensor. The light beam incident from the imaging optical system forms an image on the light receiving surface of the image sensor 201, and is photoelectrically converted by photodiodes provided in pixels arrayed in the image sensor 201 into a signal charge corresponding to the incident light amount. The signal charges stored in each photodiode are sequentially read out of the image sensor 201 as a voltage signal corresponding to the signal charges from a drive pulse output from a timing generator 214 in accordance with a command from the camera controller 212.

Each pixel of the image sensor 201 used in this embodiment includes two (a pair) of photodiodes A and B and one microlens provided for the pair of the photodiodes A and B. Each pixel forms a pair of optical images on the pair of photodiodes A and B by dividing incident light with the microlens, and the pair of photodiodes A and B output a pair of pixel signals (focus signals) including an A signal and a B signal used for an AF signal described later. Further, an imaging signal (A+B signal) can be obtained by summing up the outputs of the pair of photodiodes A and B.

A plurality of A signals output from a plurality of pixels are combined with each other, and a plurality of B signals are combined with each other, so that a pair of image signals are generated used for the AF signals (focus detecting signals) by an imaging plane phase difference detection method (imaging plane phase difference AF hereinafter). The AF signal processor 204 performs a correlation operation for the pair of image signals and calculates a phase difference (image shift amount hereinafter), which is a shift amount between the pair of image signals, and a defocus amount (and a defocus direction) of the image pickup system based on the image shift amount.

FIG. 2A illuminates a pixel configuration incompatible with the image plane phase difference AF, and FIG. 2B illustrates a pixel configuration compatible with the image plane phase difference AF. Each figure uses the Bayer array, where R stands for a red color filter, B stands for a blue color filter, and Gr and Gb stand for green color filters. In the pixel configuration in FIG. 2B, two photodiodes A and B divided into two in the horizontal direction in the figure are provided in a pixel corresponding to one pixel (enclosed by a solid line) in the pixel configuration illustrated in FIG. 2A. The pixel dividing method illustrated in FIG. 2B is merely illustrative, and may divide the pixel in the vertical direction in the figure or may divide the pixel into two both in the vertical direction and the horizontal direction (totally four pixels). Plural types of pixels divided by different dividing methods may be included in the same image sensor.

A CDS/AGC/AD converter (converter hereinafter) 202 performs correlated double sampling for removing a reset noise, a gain control, and an AD conversion for the AF signal and the image capturing signal read from the image sensor 201. The converter 202 outputs the image capturing signal and the AF signal for which the processing has been executed to an image input controller 203 and an AF signal processor 204, respectively.

The image input controller 203 stores the image capturing signal output from the converter 202 as an image signal in an SDRAM 209 via a bus 21. The image signal stored in the SDRAM 209 is read by a display controller 205 via the bus 21 and displayed on a display unit 206. In a mode of recording the image signal, the image signal stored in the SDRAM 209 is recorded in the recording medium 209, such as a semiconductor memory, by a recording medium controller 207.

A ROM 210 stores a control program and a processing program executed by the camera controller 212, various data necessary for executing them, and the like. A flash ROM 211 stores various setting information and the like regarding the operation of the camera body 20 set by the user.

A camera controller (focusing apparatus) 212 includes a microcomputer, and governs the entire camera system including the lens unit 10 by executing a computer program stored in the ROM 210. The camera controller 212 includes an object detector 2121, an object tracker, an AF controller (focusing unit) 2123, an AF control switching unit 2124, a prediction unit 2125, a memory 2126, and a motion determiner (determination unit) 2127.

The object detector 2121 detects a specific object based on the imaging signal input from the image input controller 203, and determines the position of the specific object in the imaging signal. The object detector 2121 continuously acquires an imaging signal from the image input controller 203, and when the specific object moves, determines the position of the destination, and detects the position of the specific object. The specific object is, for example, a face object or an object located at a position designated by the user on the image (imaging screen) with the camera operation unit (operation unit) 213. When the object detected by the object detector 2121 is set as the AF target, the object tracker 2122 identifies and tracks the position of the same object using a method different from that of the object detector 2121, for example, color information.

The AF signal processor 204 performs a correlation operation for a pair of image signals, which are AF signals output from the converter 202, and calculates an image shift amount (detection amount) and reliability of the pair of image signals. The reliability is calculated using a two-image matching level and a steepness of a correlation change amount described later. The AF signal processor 204 sets the position and size of a focus detecting area that is an area for which the focus detection and AF are performed in the image. The AF signal processor 204 outputs information on the image shift amount and the reliability calculated in the focus detecting area to the camera controller 212. Details of the processing performed by the AF signal processor 204 will be described later.

The AF controller 2123 instructs the lens controller 106 to move the focus position based on the defocus amount for focusing. The method of the focusing operation performed by the AF controller 2123 is switched by the AF control switching unit 2124 based on the operation of the motion determiner 2127 and the camera operation unit 213. Further, the AF controller 2123 predicts a future image plane position using the prediction unit 2125, calculates a lens driving amount necessary for the focus lens 103 to move to the predicted image plane position, and sends an instruction to the lens controller 106. This is performed when, in the focusing operation performed by the AF controller 2123, a method of continuously performing the focusing operation for a moving object or the like is selected.

The memory 2126 causes the memory circuit 215 to store the object image plane position calculated from the focus amount at the imaging time.

The motion determiner 2127 determines whether or not the object is a moving object, based on the information on the imaging time and the object image plane position stored in the memory circuit 215. Details of the processing performed by the motion determiner 2127 will be described later.

In response to an input from a camera operation unit (operation means) 213 based on a user operation, the camera controller 212 executes various processing corresponding to the user operation, such as turning on and off the power, changing various settings, imaging processing, AF processing, and reproduction processing for a recorded image, and the like. The camera operation unit 213 has a release switch. When the release switch is operated by one step (half-pressed), a first release switch SW1 is turned on, and the camera controller 212 starts an imaging preparation operation such as focusing and photometry. When the release switch is operated by two steps (fully pressed), a second release switch SW2 is turned on, and the camera controller 212 starts imaging and recording such as exposure and development processing. Further, the camera controller 212 transmits a control command to the lens unit 10 (the lens controller 106) and information on the camera body 20 to the lens controller 106, and acquires information on the lens unit 10 from the lens controller 106. The camera controller 212 calculates a defocus amount using the image shift amount in the focus detecting area calculated by the AF signal processor 204, and controls driving of the focus lens 103 through the lens controller 106 based on the defocus amount.

Figure 3:
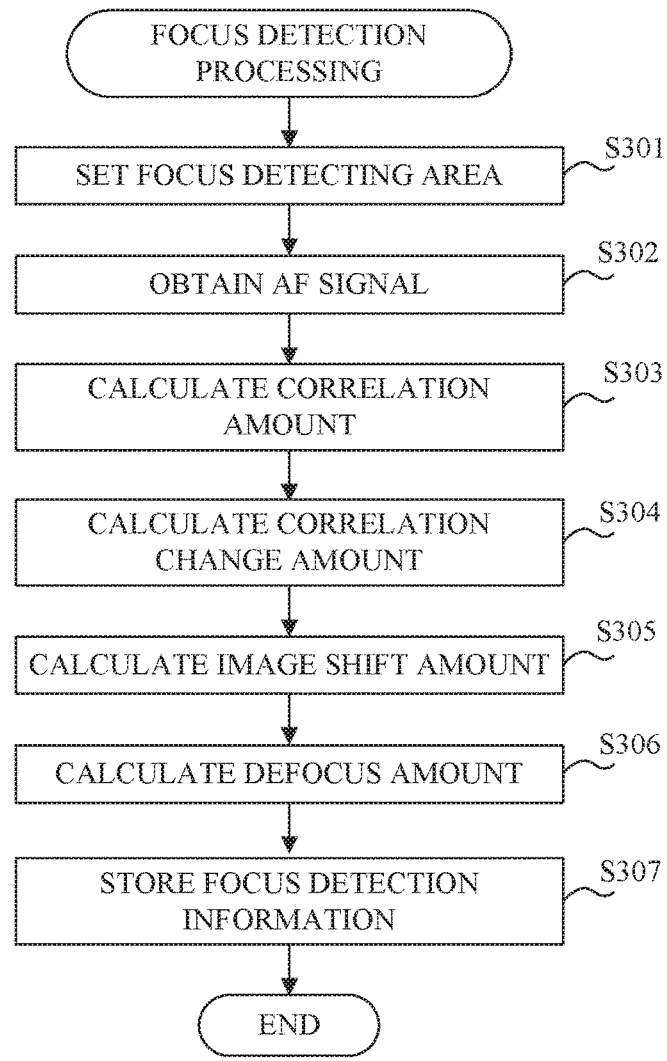
FIG. 3 is a flowchart showing focus detection processing.

A description will now be given of focus detection processing executed by the camera controller 212. The camera controller 212 performs processing in FIG. 3 according to a computer program. FIG. 3 is a flowchart showing the focus detection processing. "S" stands for the step.

In the step S301, the AF signal processor 204 sets a focus detecting area according to an instruction from the camera controller 212. The position, size, number, and the like of the focus detecting areas to be set differ depending on the AF method selected by the camera controller 212 and the control state of the AF controller 2123.

Figure 4:
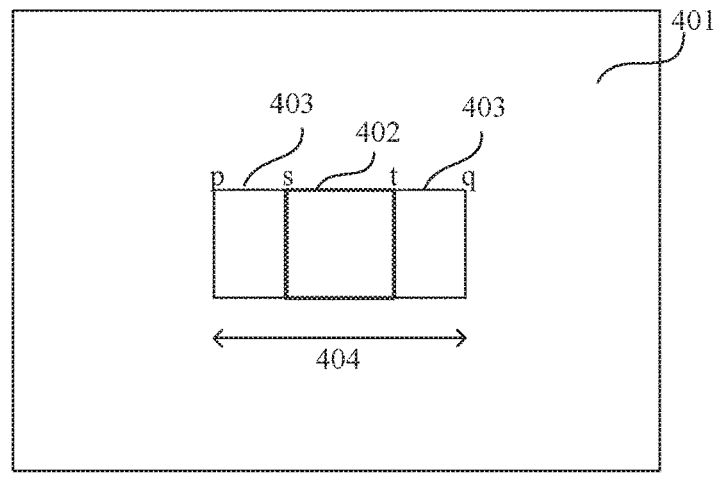
FIG. 4 illustrates an illustrative focus detecting area.

In the step S302, the AF signal processor 204 acquires a pair of image signals as AF signals from a plurality of pixels included in the focus detecting area of the image sensor 201. FIG. 4 illustrates an illustrative focus detecting area 402 on a pixel array 401 of the image sensor 201. Shift areas 403 on both sides of the focus detecting area 402 are areas necessary for the correlation calculation. Therefore, an area 404 made by combining the focus detecting area 402 and the shift areas 403 is a pixel area necessary for the correlation calculation. In the figure, p, q, s, and t represent coordinates in the horizontal direction (x-axis direction), respectively, where p and q are the x coordinates of a start point and an end point of the area 404, and s and t are the x coordinates of a start point and an end point of the focus detecting areas 402, respectively.

Figure 5A:
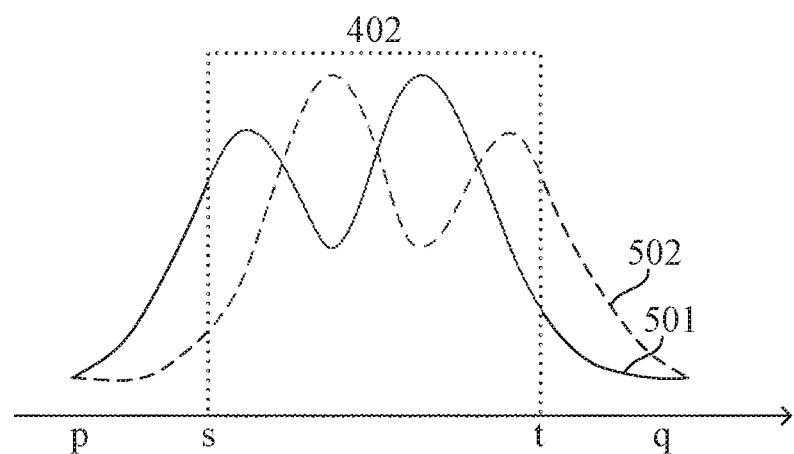
FIGS. 5A to 5C illustrate examples of a signal for AF.
Figure 5B:
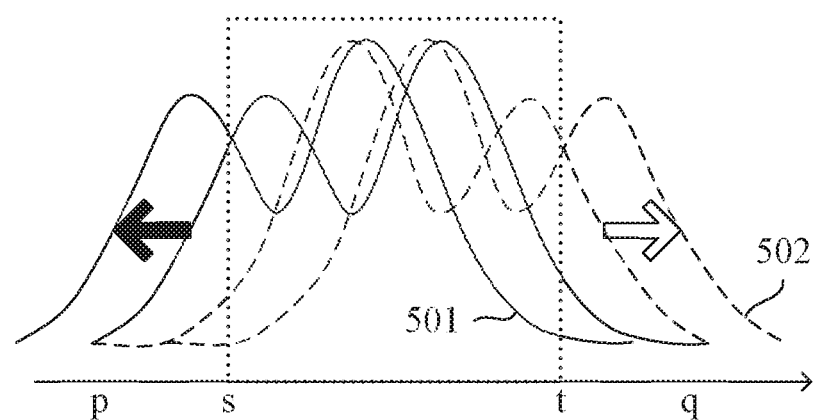
Figure 5C:
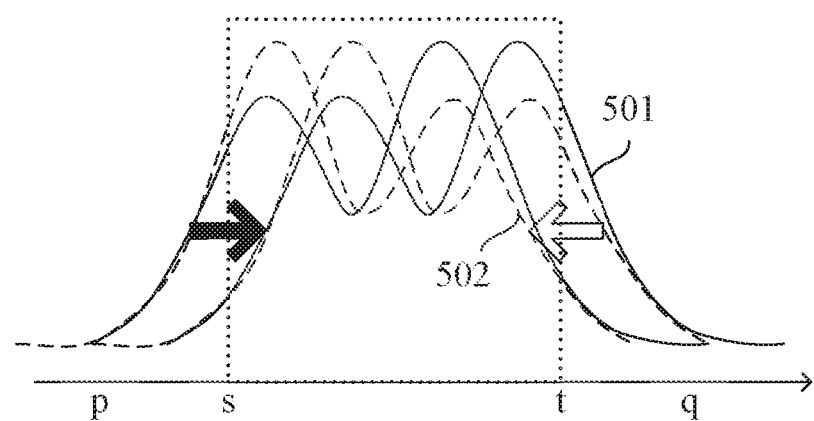

FIGS. 5A to 5C illustrate an illustrative pair of image signals (An image signal and B image signal) as the AF signals acquired from a plurality of pixels included in the focus detecting area 402 in FIG. 4. A solid line 501 represents an A-image signal, and a broken line 502 represents a B-image signal. FIG. 5A illustrates the A-image signal and B-image signal before shifting, and FIGS. 5B and 5C illustrate the A-image signal and the B-image signal shifted from the state in FIG. 5A in the plus direction and the minus direction.

In the step S303, the AF signal processor 204 calculates a correlation amount between the pair of image signals while relatively shifting the acquired pair of image signals one pixel (one bit) by one pixel. In each of a plurality of pixel lines (scanning lines hereinafter) provided in the focus detecting area, both the A-image signal and the B-image signal are shifted one bit by one bit in the arrow direction illustrated in FIGS. 5A and 5B to calculate the correlation amount between the pair of image signals. Then, the respective correlation amounts are added and averaged to calculate one correlation amount. Herein, the pair of image signals are relatively shifted one pixel by one pixel in calculating the correlation amount, but these signals may be relatively shifted every two or more pixels. In addition, one correlation amount is calculated by averaging the correlation amounts of respective scanning lines, but another method may be used, for example, which averages the pair of image signals of each scanning line, and then calculates the correlation amount with the pair of averaged image signals. The correlation amount COR can be calculated by the expression (1) where i is a shift amount, p−s is a minimum shift amount, q−t is a maximum shift amount, x is a starting coordinate of the focus detecting area 402, and y is an end coordinate of the focus detecting area 402.

$$COR[i] = \sum_{k=x}^{y} |A[k+i] - B[k-i]| \qquad (1)$$

$$\{(p-s) < i < (q-t)\}$$

Figure 6A:
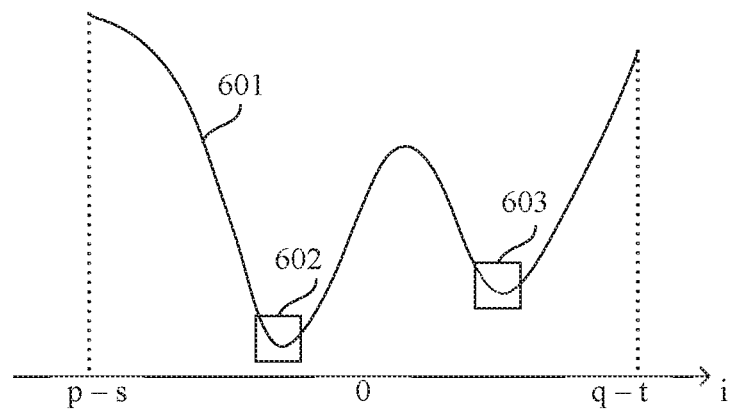
FIGS. 6A and 6B are an explanatory diagrams of a relationship between a shift amount and a correlation amount.

FIG. 6A illustrates an illustrative relationship between the shift amount i and the correlation amount COR. The abscissa axis represents the shift amount i, and the ordinate axis represents the correlation amount COR. Of the extreme values 602 and 603 in the correlation amount 601 that changes with the shift amount i, the matching level between the pair of image signals is the highest in the shift amount corresponding to the smaller correlation amount.

In the step S304, the AF signal processor 204 calculates a correlation change amount from the correlation amount calculated in the step S303. In FIG. 6A, the difference between the correlation amounts at every other shift in the waveform of the correlation amount 601 is calculated as the correlation change amount. The correlation change amount ΔCOR can be calculated by the following expression (2) with the shift amount i, the minimum shift amount p−s, and the maximum shift amount q−t.

$$\Delta COR[i] = COR[i-1] - COR[i+1]$$

$$\{(p-s+1) < i < (q-t-1)\} \qquad (2)$$

Figure 7A:
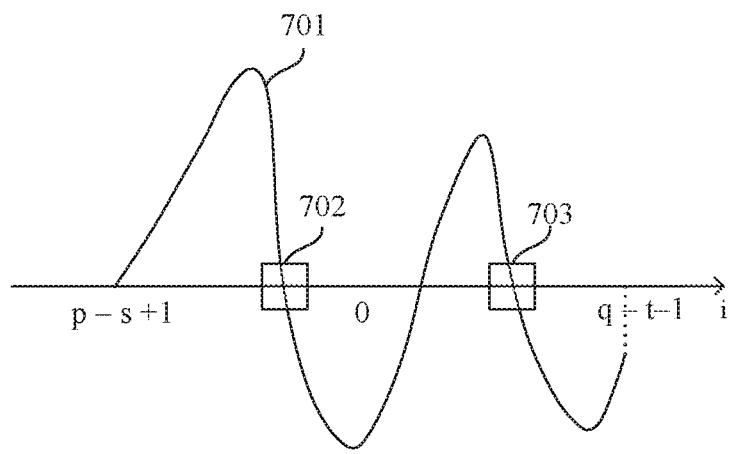
FIGS. 7A and 7B are explanatory diagrams of a relationship between the shift amount and a correlation change amount.
Figure 7B:
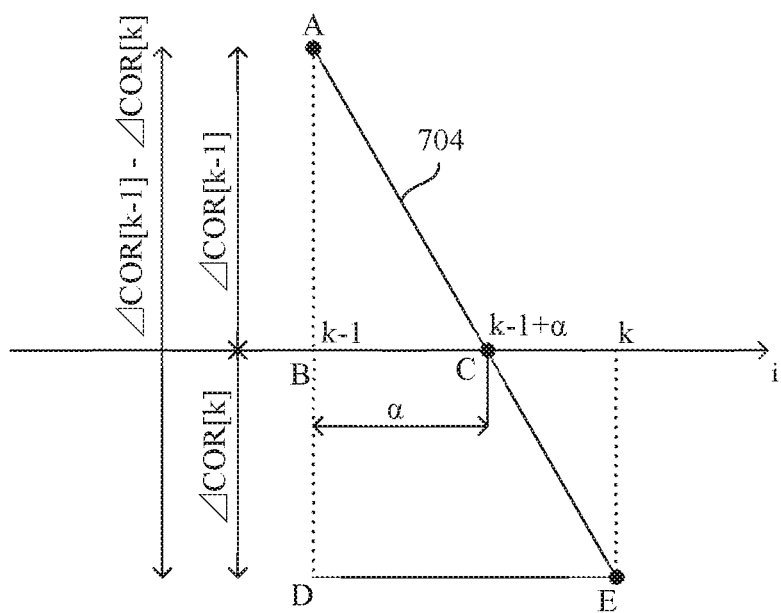

In the step S305, the AF signal processor 204 calculates an image shift amount using the correlation change amount calculated in the step S304. FIG. 7A illustrates an illustrative relationship between the shift amount i and the correlation change amount ΔCOR. The abscissa axis represents the shift amount, and the ordinate axis represents the correlation change amount ΔCOR. A correlation change amount 701 that changes with the shift amount i changes from plus to minus at portions 702 and 703. The state where the correlation change amount is 0 is called zero cross, and the matching level between the pair of image signals becomes the highest. Therefore, the shift amount giving the zero cross is the image shift amount. FIG. 7B is an enlarged view of the portion 702 in FIG. 7A. Reference numeral 704 denotes part of the correlation change amount 701. The shift amount (k−+α) that gives the zero cross is divided into an integer part β and a decimal part α. The decimal part α can be calculated from the similarity between a triangle ABC and a triangle ADE in the figure by the following expression (3).

$$AB:AD = BC:DE \qquad (3)$$

$$\Delta COR[k-1] = \Delta COR[k-1] - \Delta COR[k] = \alpha:k-(k-1)$$

$$\alpha = \frac{\Delta COR[k-1]}{\Delta COR[k-1] - \Delta COR[k]}$$

The integer part β can be calculated from FIG. 7B by the following expression (4).

$$\beta = k-1 \qquad (4)$$

In other words, the image shift amount PRD can be calculated from the sum of the decimal part α and the integer part β. As illustrated in FIG. 7A, when the correlation change amount ΔCOR has a plurality of zero crosses, the one having the highest or higher steepness of the change of the correlation change amount ΔCOR near them is set to a first zero cross. The steepness is an index indicating the easiness of the AF, and indicates that the larger the value, the more easily the accurate AF can be performed. The steepness maxder can be calculated by the following expression (5).

$$\text{maxder} = |\Delta COR[k-1]| + |\Delta COR[k]| \qquad (5)$$

In this embodiment, when the correlation change amount ΔCOR has a plurality of zero crosses, the first zero cross is determined based on its steepness, and the shift amount giving the first zero cross is set to the image shift amount.

In the step S306, the AF signal processor 204 calculates the defocus amount of the focus detecting area using the image shift amount of the focus detecting area calculated in the step S305.

In the step S307, the camera controller 212 causes the memory circuit 215 to store the obtained focus detection information. Herein, the memory circuit 215 stores the defocus amount of each focus detecting area, the imaging time and the image plane speed of the A-image signal and the B-image signal.

A description will now be given of a method of calculating the reliability of the image shift amount. The reliability of the image shift amount can be defined by the matching level (two-image matching level hereinafter) fnclvl of the pair of image signals and the steepness of the correlation change amount. The two-image matching level is an index indicating the accuracy of the image shift amount. In the correlation calculation in this embodiment, a smaller value indicates higher accuracy.

Figure 6B:
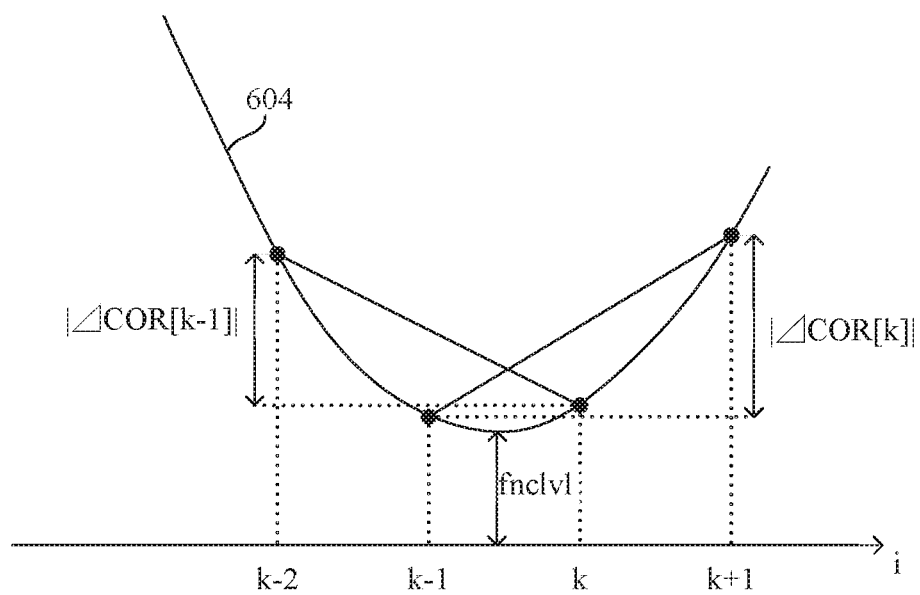

FIG. 6B is an enlarged view of the portion 602 in FIG. 6A, and reference numeral 604 denotes part of the correlation amount 601. The two-image matching level fnclvl can be calculated by the following expressions (6).

(i) When $|\Delta COR[k-1]| \times 2 \leq \text{maxder}, \text{Fnclv} = COR[k-1] + \Delta COR[k-1]/4$ (ii) When $|\Delta COR[k-1]| \times 2 > \text{maxder}, \text{Fnclv} = COR[k] - \Delta COR[k]/4$ \hfill (6)

Figure 8:
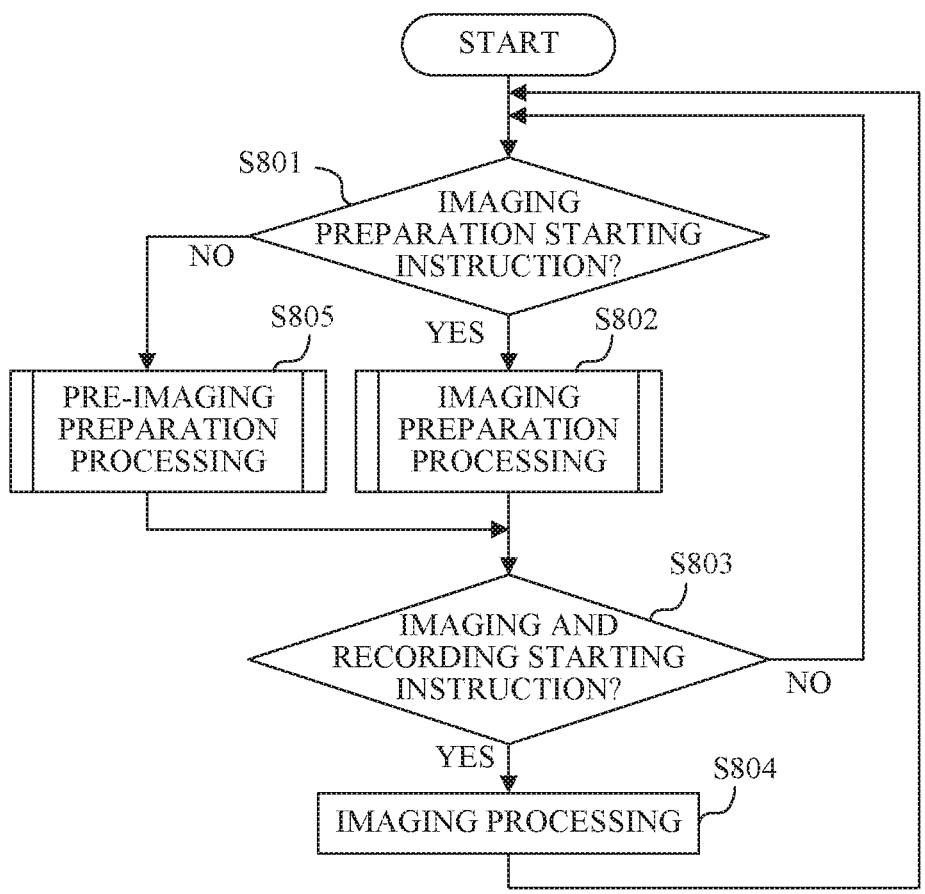
FIG. 8 is a flowchart showing the operation of the camera body.

Referring now to flowcharts in FIGS. 8 to 10, a description will be given of an outline of a basic focus operation of the camera body 20. FIG. 8 is the flowchart showing the operation of the camera body 20.

When the camera body 20 is operated and powered on, a series of initialization processing such as reading from the image sensor 201 and displaying an image on the display unit 206 are performed.

In the step S801, the camera controller 212 determines whether an imaging preparation starting instruction has been issued by a user's camera operation. That is, it is determined whether the first release switch SW1 is turned on. If the imaging preparation starting instruction has been issued, the flow moves to the step S802. If no imaging preparation starting instruction has been issued, the flow moves to the step S805.

In the step S802, the camera controller 212 performs the imaging preparation processing described later.

In the step S805, the camera controller 212 performs pre-imaging preparation processing described later. In this step, an auto-exposure control, a white balance adjustment, and the like are also performed according to the settings of the camera body 20.

In the step S803, the camera control section 212 determines whether or not an imaging and recording starting instruction has been issued by a user's camera operation. In other words, it is determined whether the second release switch SW2 is turned on. If the imaging and recording starting instruction has been issued, the flow moves to the step S804. If no imaging and recording starting instruction has been issued, the flow returns to step S801.

In the step S804, the camera controller 212 performs processing such as recording a still image using an imaging signal as imaging processing. After the processing in the step S804, the flow returns to the step S801.

Figure 9:
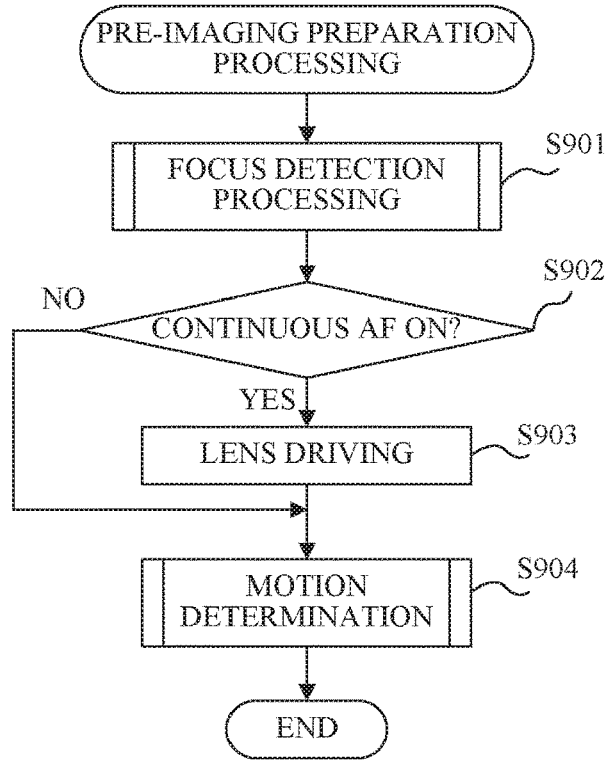
FIG. 9 is a flowchart showing pre-imaging preparation processing.

Referring now to FIG. 9, a description will be given of the pre-imaging preparation processing. FIG. 9 is a flowchart showing the pre-imaging preparation processing. The pre-imaging preparation processing is processing before the first release switch SW1 is operated.

In the step S901, the camera controller 212 performs focus detection processing, and mainly acquires the defocus amount of the set AF area.

In the step S902, the camera controller 212 determines whether the focus operation setting of the camera body 20 is a continuous operation setting (continuous AF). If it is the continuous operation setting, the flow proceeds to the step S903, and if not, the flow proceeds to the step S904.

In the step S903, the camera controller 212 drives the focus lens according to the defocus amount, and performs autofocusing even when there is no user operation.

In the step S904, the camera controller 212 performs the motion determination processing, and stores as a determination result whether or not the imaging target is a moving object. The motion determination processing will be described later.

Figure 10:
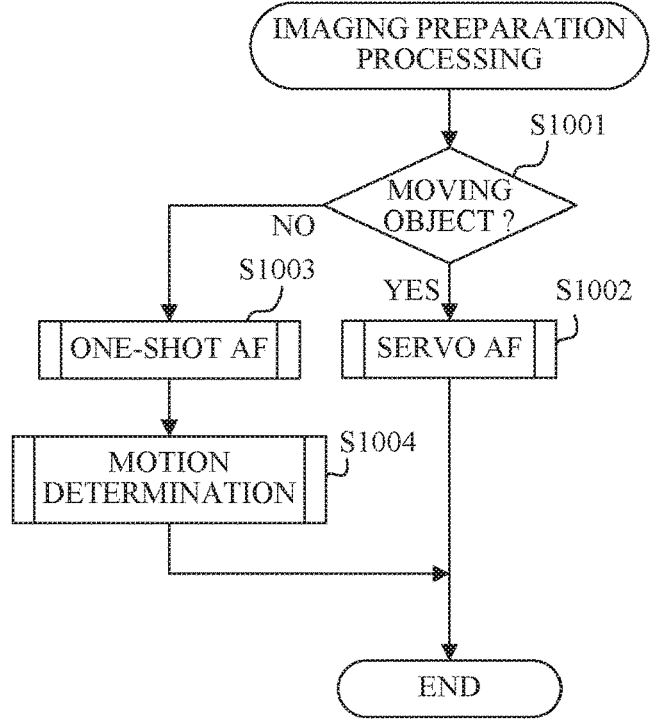
FIG. 10 is a flowchart showing imaging preparation processing.

Referring now to FIG. 10, a description will be given of the imaging preparation processing. FIG. 10 is a flowchart showing the imaging preparation processing. The imaging preparation processing is processing after the first release switch SW1 is operated, and is performed while the first release switch SW1 is being operated.

In the step S1001, the camera controller 212 determines whether or not the imaging target is determined to be a moving object in the step S904 in FIG. 9. If the object is determined to be the moving object, the flow proceeds to the step S1002. If the object is not determined to be the moving object, the flow proceeds to the step S1003.

In the step S1002, the camera controller 212 performs the servo AF (first focusing) configured to continuously perform focusing.

In the step S1003, the camera controller 212 performs the one-shot AF (second focusing) configured to perform focusing once.

In the step S1004, the camera controller 212 performs motion determining processing.

Figure 11:
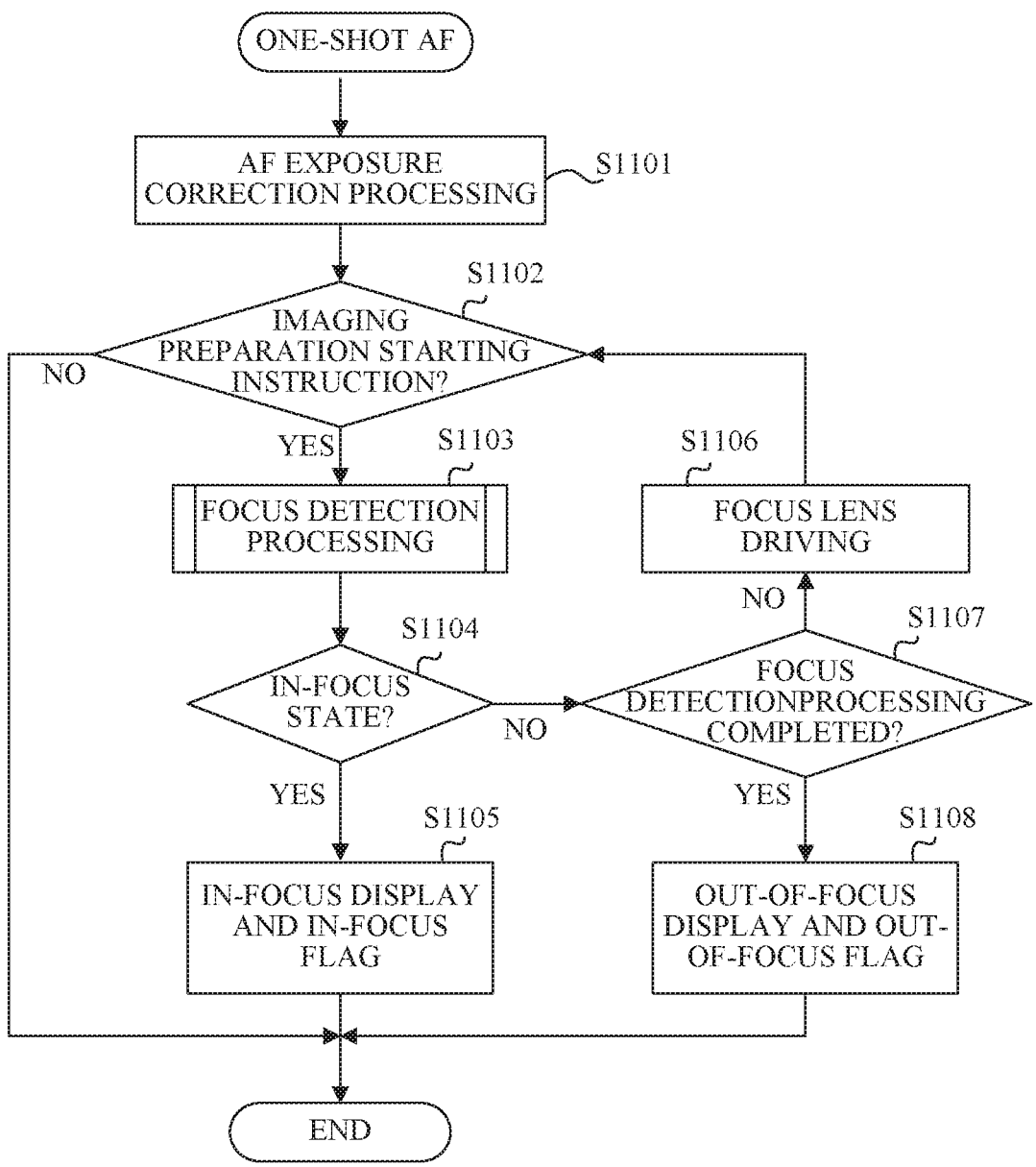
FIG. 11 is a flowchart showing a one-shot AF operation.

Referring now to FIG. 11, a description will be given of the one-shot AF. FIG. 11 is a flowchart showing the one-shot AF operation.

In the step S1101, the camera controller 212 performs exposure setting (exposure correction processing) such as ISO speed (gain), aperture stop, and shutter speed so as to set the exposure suitable for the imaging plane phase difference AF i before the focus operation.

In the step S1102, the camera controller 212 determines whether or not a user has issued the imaging preparation starting instruction. If the imaging preparation start instruction has been issued, the flow moves to the step S1103. If no imaging preparation start instruction has been issued, the imaging preparation processing ends.

In the step S1103, the camera controller 212 performs focus detection processing.

In the step S1104, the camera controller 212 determines whether or not the object has been focused. If the object is in focus, the flow proceeds to the step S1105. If the object is not focused, the flow proceeds to the step S1107.

In the step S1105, the camera controller 212 causes the display unit 206 to display the in-focus state. Thereafter, an in-focus flag for the focus control is turned on, and this flow ends.

In the step S1107, the camera controller 212 determines whether to end the focus detection processing. If the focus detection is successfully made and a reliable and correct defocus amount has been obtained, the focus lens is driven using the focus detection processing result (S1106), and the flow returns to the step S1102. On the other hand, if it is determined in the step S1107 that the focus detection result cannot be correctly obtained, the focus lens driving operation that does not use the obtained result is performed to switch to a lens operation such as a search, and the flow returns to the step S1102. As described above, the focus detection and the focus lens driving operation are repeated, and when the in-focus state cannot be determined and it takes too much time for the focus detection, it is determined in the step S1107 to end the focus detection processing. In such a case, the flow shifts to the step S1108, the camera controller 212 causes the display unit 206 to display the out-of-focus state, turns on an out-of-focus flag for the focus control, and ends this flow.

Figure 12:
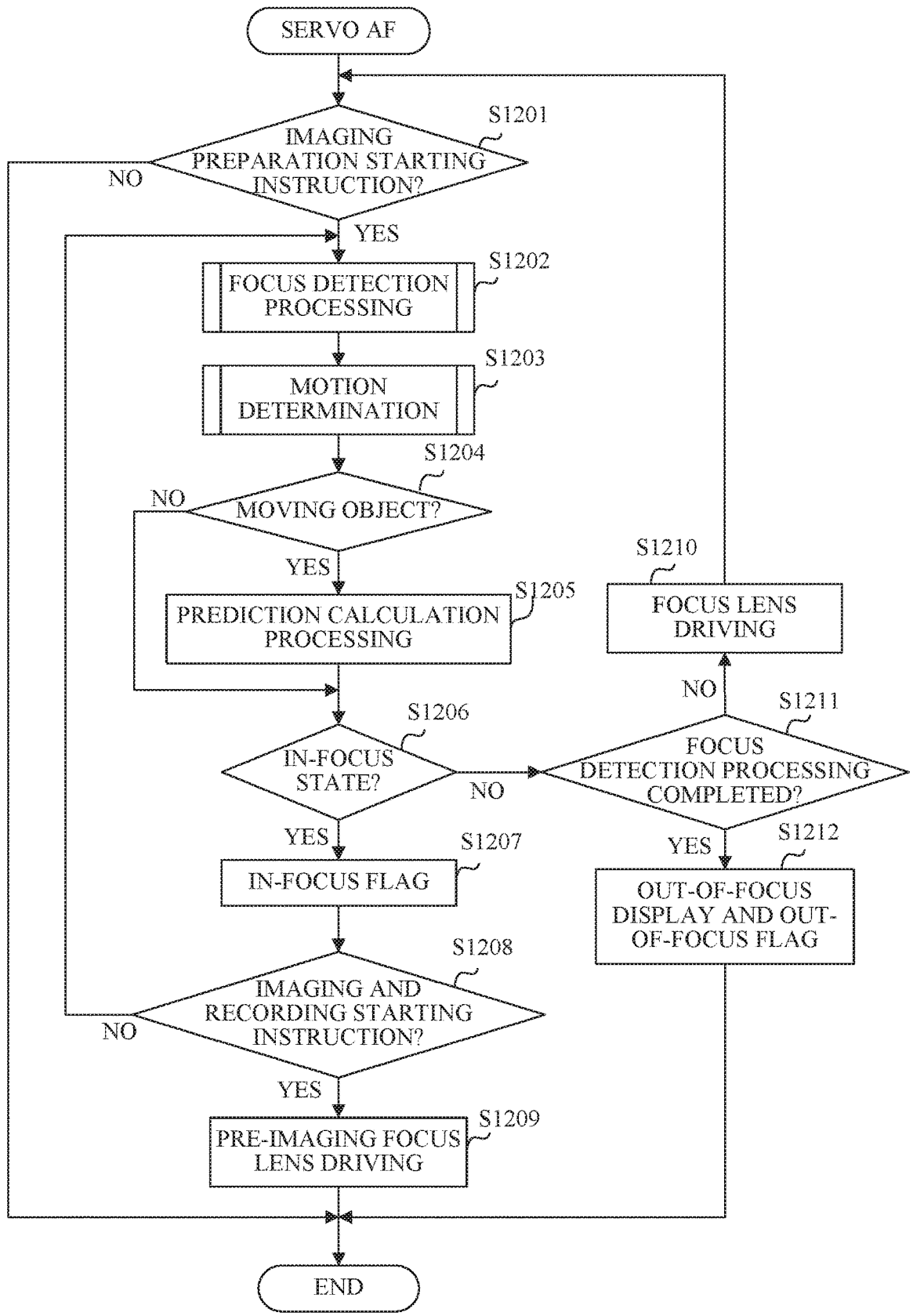
FIG. 12 is a flowchart showing a servo AF operation.

Referring now to FIG. 12, a description will be given of the servo AF. FIG. 12 is a flowchart showing the servo AF operation.

In the step S1201, the camera controller 212 determines whether or not the user has issued the imaging preparation starting instruction. If the imaging preparation starting instruction has been issued, the flow proceeds to the step S1202, and if no imaging preparation starting instruction has been issued, this processing ends.

In the step S1202, the camera controller 212 performs the focus detection processing.

In the step S1203, the camera controller 212 monitors a defocus amount in the time-series direction and makes the motion determination.

In the step S1204, the camera controller 212 determines whether the imaging target is the moving object. If the object is the moving object, the flow proceeds to the step S1205; otherwise, the flow proceeds to the step S1206.

In the step S1205, the camera controller 212 predicts and calculates the object position or the image plane position of the object in the next frame based on the information on the defocus amount and the current focus lens position, and performs prediction calculation processing to calculate the next lens driving amount.

In the step S1206, the camera controller 212 determines whether the object is focused. If the object is in focus, the flow proceeds to the step S1207, and if not, the flow proceeds to the step S1211.

In the step S1207, the camera controller 212 turns on the focusing flag for the focus control.

In the step S1208, the camera controller 212 determines whether the imaging and recording starting instruction has been issued by a user's camera operation. If the imaging and recording starting instruction has been issued, the flow moves to the step S1209. If no imaging and recording starting instruction has been issued, the flow returns to the step S1202.

In the step S1209, the camera controller 212 drives the focus lens before imaging using the results of the focus detection processing and the prediction calculation processing.

In the step S1211, the camera controller 212 determines whether to end the focus detection processing. If the focus detection is successfully performed and a reliable and correct defocus amount has been calculated, the focus lens is driven (step S1210) based on the focus lens driving amount that reflects the results of the motion detection and prediction calculation processing, and the flow returns to the step S1201. On the other hand, if it is determined in the step S1211 that the focus detection result is not correctly obtained, or if it is determined that the focus detection processing is to be ended due to the object is lost or switched, the flow moves to the step S1212. In the step S1212, the camera controller 212 causes the display unit 206 to perform the out-of-focus display, turns on the out-of-focus flag for the focus control, and ends the processing.

Figure 13:
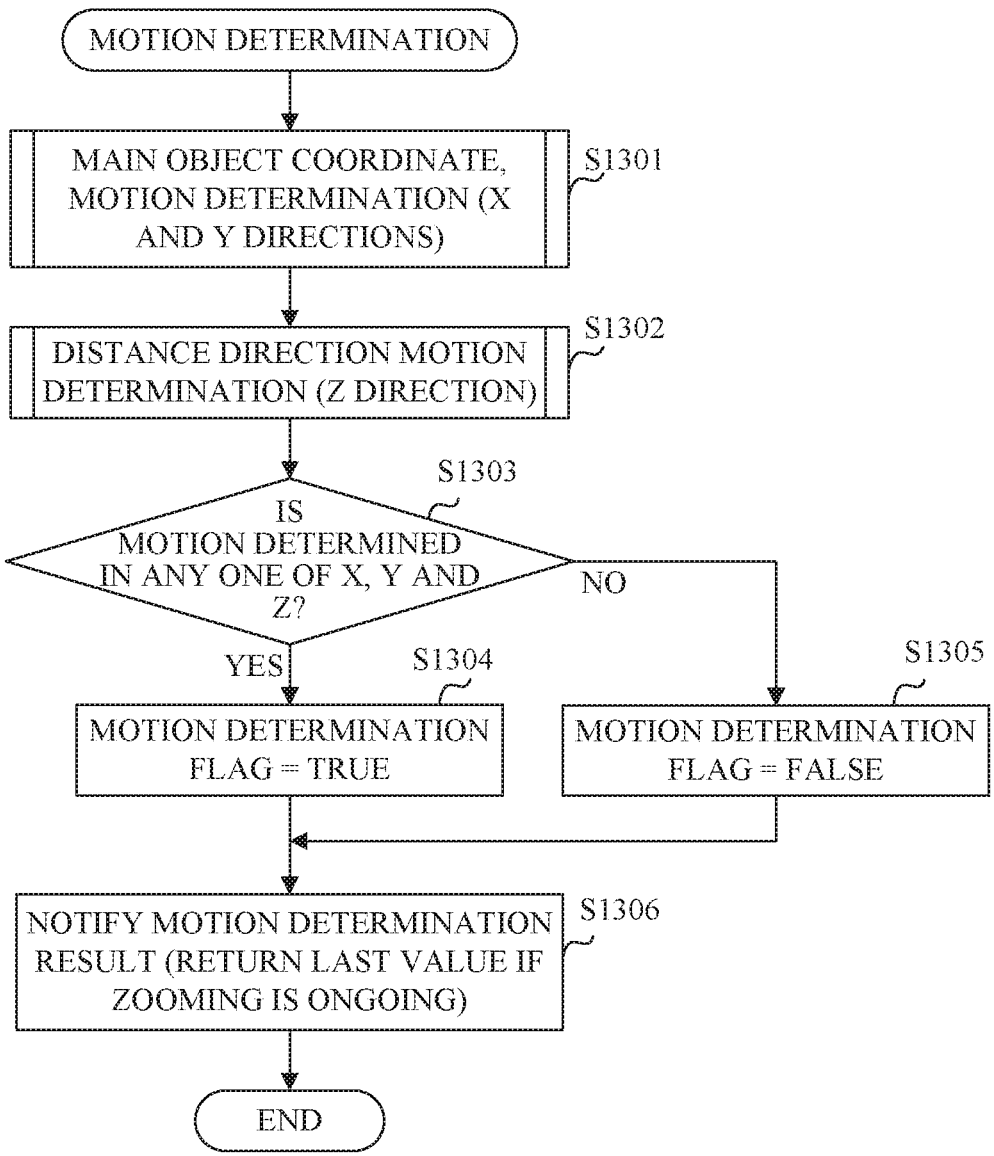
FIG. 13 is a flowchart showing a motion determination according to a first embodiment.

Referring now to FIG. 13, a description will be given of the outline of the motion determination in the steps S904, S1004, and S1203. FIG. 13 is a flowchart showing the motion determination.

In the step S1301, the camera controller 212 makes a main object coordinate movement determination for detecting the motion (referred to as XY motion hereinafter) in a parallel direction (x-axis direction and y-axis direction) between the camera body 20 and the object.

In the step S1302, the camera controller 212 makes a distance direction motion determination for detecting the motion (Z motion hereinafter) of the distance direction (z-axis direction) between the camera body 20 and the object.

In the step S1303, the camera controller 212 determines whether the motion of at least one of the XY motion and the Z motion has been determined. When the motion is determined, the flow proceeds to the step S1304, and when the motion is not determined, the flow proceeds to the step S1305.

In the step S1304, the camera controller 212 sets TRUE to the motion determination flag for the switching determination of the focusing operation.

In the step S1305, the camera controller 212 sets FALSE to the motion determination flag.

In the step S1306, the camera controller 212 notifies the motion determination result, but when the zoom lens is operating, the camera controller 212 returns the motion detection result of the object preceding by one frame or before the zoom lens operation, instead of the current motion detection result.

Figure 14:
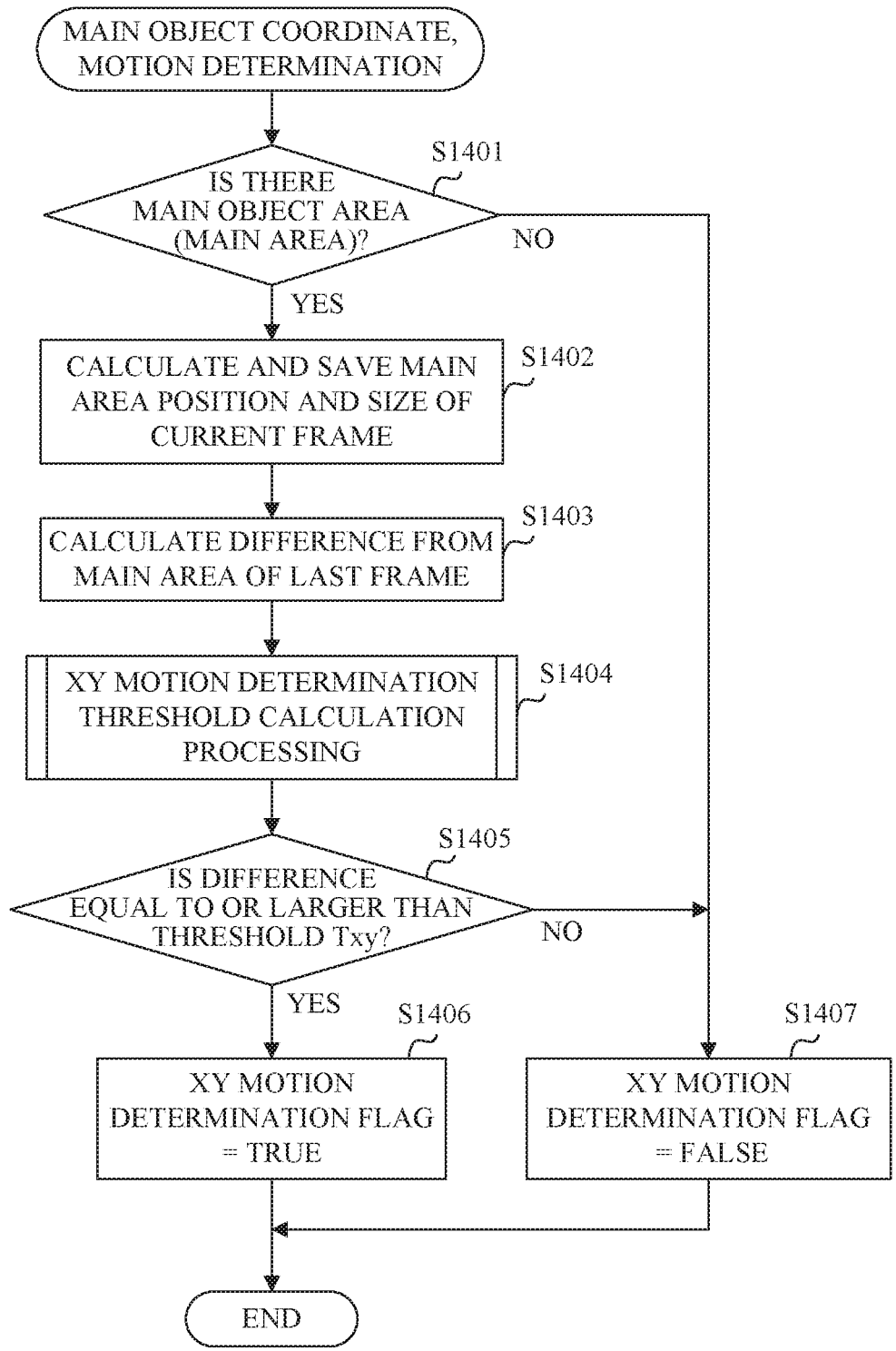
FIG. 14 is a flowchart showing main object coordinate motion determination.

Referring now to FIG. 14, a description will be given of the main object coordinate motion determination. FIG. 14 is a flowchart showing the main object coordinate movement determination processing.

In the step S1401, the camera controller 212 determines whether there is a main object area (main area). If there is the main object area, the flow proceeds to the step S1402. If there is no main object area, the flow proceeds to the step S1407 because no motion detection can be performed.

In the step S1402, the camera controller 212 calculates the position and size of the main area of the current frame, and saves the result.

In the step S1403, the camera controller 212 extracts the position and size of the main area detected in the last frame, and calculates a difference from the current frame.

In the step S1404, the camera controller 212 performs the XY motion determination threshold calculation processing.

In the step S1405, the camera controller 212 determines whether the difference calculated in the step S1403 is larger than threshold Txy calculated in the step S1404. When the difference is larger than the threshold Txy, the flow proceeds to the step S1406, and when the difference is smaller than the threshold Txy, the flow proceeds to the step S1407. When the difference is equal to the threshold Txy, which step is to proceed is arbitrary.

In the step S1406, the camera controller 212 sets TRUE to a XY motion determination flag used in the step S1303 in FIG. 13.

In the step S1407, the camera controller 212 sets FALSE to the XY motion determination flag, indicating that there are no XY motions.

Figure 15A:
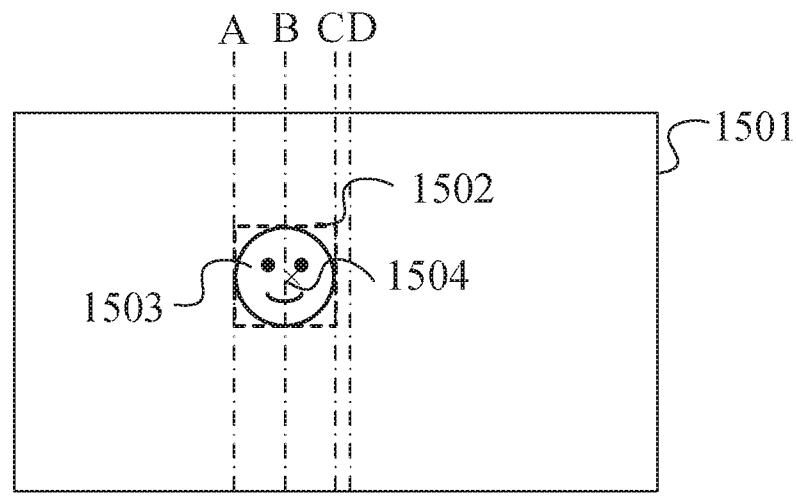
FIGS. 15A to 15C explain main object coordinate motions.
Figure 15B:
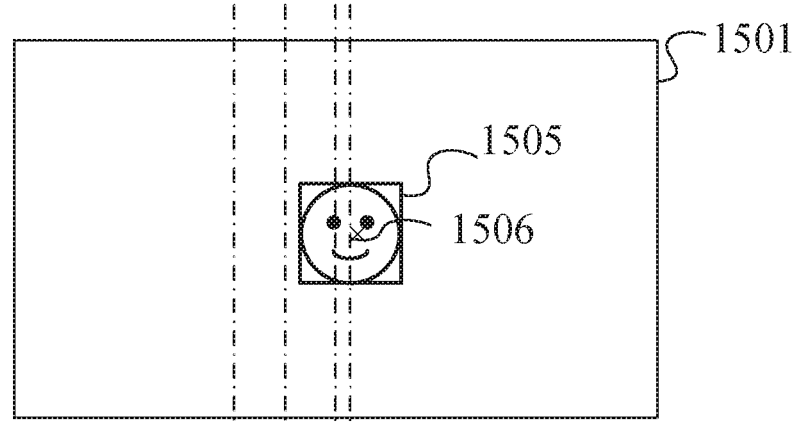
Figure 15C:
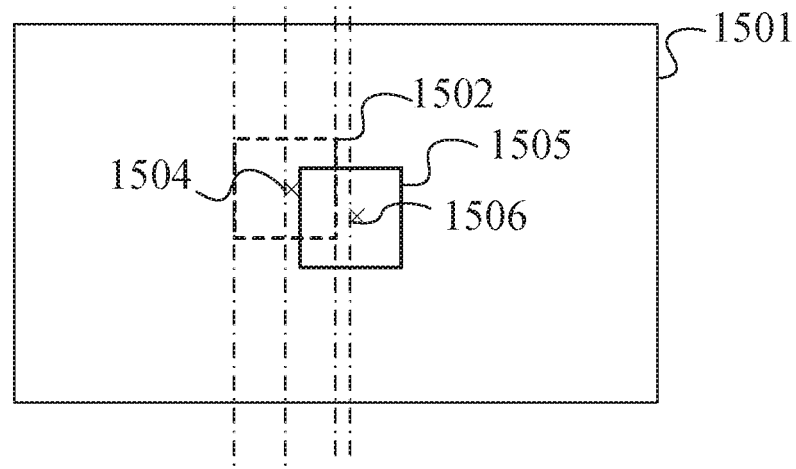
Figure 16:
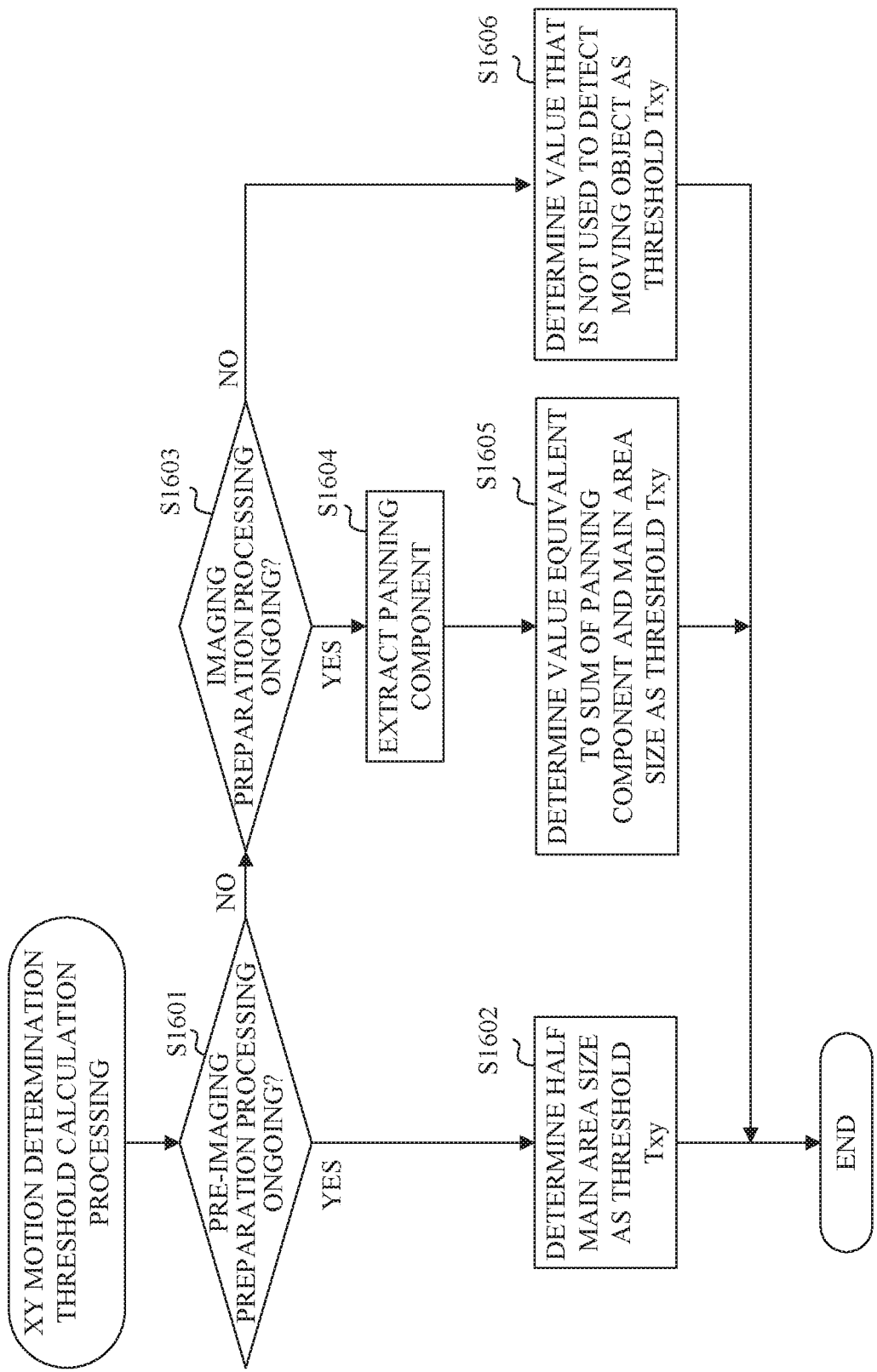
FIG. 16 is a flowchart showing an XY motion determination threshold calculation processing.

Referring now to FIGS. 15A-15C and 16, a description will be given of the XY motion determination threshold calculation processing in S1404 in FIG. 14. FIGS. 15A to 15C explain the main object coordinate motion. FIG. 16 is a flowchart showing the XY direction motion determination threshold calculation processing.

In the step S1601, the camera controller 212 determines whether or not the pre-imaging preparation processing is ongoing. If the pre-imaging preparation processing is ongoing, the flow moves to the step S1602.

In the step S1602, the camera controller 212 determines half a value of the main area size as the threshold Txy. FIG. 15A illustrates a schematic image of the display unit 206 of a predetermined frame (N-th frame). Reference numeral 1501 denotes an entire image in which only a human face is drawn. Reference numeral 1503 denotes the human face, reference numeral 1502 denotes a main area in which the camera body 20 recognizes and displays the human face, and reference numeral 1504 denotes a center of the main area 1502. FIG. 15B illustrates a schematic image of the display unit 206 of the next frame ((N+1)-th frame), on the assumption that the imaging target has moved in the XY directions while the face size (=main area size) has also moved in the XY directions. Reference numeral 1505 denotes the main area of the (N+1)-th frame, and reference numeral 1506 denotes the center of the main area of the (N+1)-th frame. FIG. 15C illustrates a combination of only the main areas in FIGS. 15A and 15B and the states of the centers of the main areas. Additional lines A to D indicate the left end of the main area of the N-th frame, the center of the main area of the N-th frame, the right end of the main area of the N-th frame, and the center of the main area of the (N+1)-th frame, respectively. In FIGS. 15A to 15C, the half value of the main area size corresponds to an interval between the additional lines A and B. The case where the difference calculated in the step S1403 is larger than the half value of the main area size (threshold Txy) and the XY motion determination flag is set to TRUE is the case where the state of FIG. 15A is changed to the state of FIG. 15B. More specifically, this is a case where the center of the current frame is located outside the main area of the last frame. In this case, since it is assumed that the monitoring target such as the focus detection and exposure adjustment deviates from the main area 1502 of the N-th frame, tracking processing starts with the motion detection. This embodiment describes the main area as having the same size in the X and Y directions, or a square, but if the main area has different sizes in the X and Y directions, different thresholds are provided in the X and Y directions and the equivalent processing may be performed.

In the step S1603, the camera controller 212 determines whether or not the imaging preparation processing is ongoing. If the imaging preparation processing is ongoing, the flow proceeds to the step S1604. If the imaging preparation processing is not ongoing, the flow proceeds to the step S1606.

In the step S1604, the camera controller 212 extracts a panning component of the camera system, and acquires information on how the entire camera system is panned. This embodiment uses a method of extracting a motion vector of an image based on continuous images read out of the image sensor 201 and of detecting the motion of the entire camera system. Alternatively, a method of detecting a motion of the entire camera system may be used by attaching a speed sensor, an acceleration sensor, or the like to the camera body 20.

In the step S1605, the camera controller 212 determines the addition result as the threshold Txy based on the panning information and the main area size (although the addition result is separated for each vector in the XY directions). The threshold Txy determined in this step is made larger than the threshold Txy determined in the step S1602. In other words, the motion detection in the XY directions is less likely to be determined as a motion during the imaging preparation processing than during the pre-imaging preparation processing.

In the step S1606, the camera controller 212 determines a value at which no moving object is detected, as the threshold Txy.

Figure 17A:
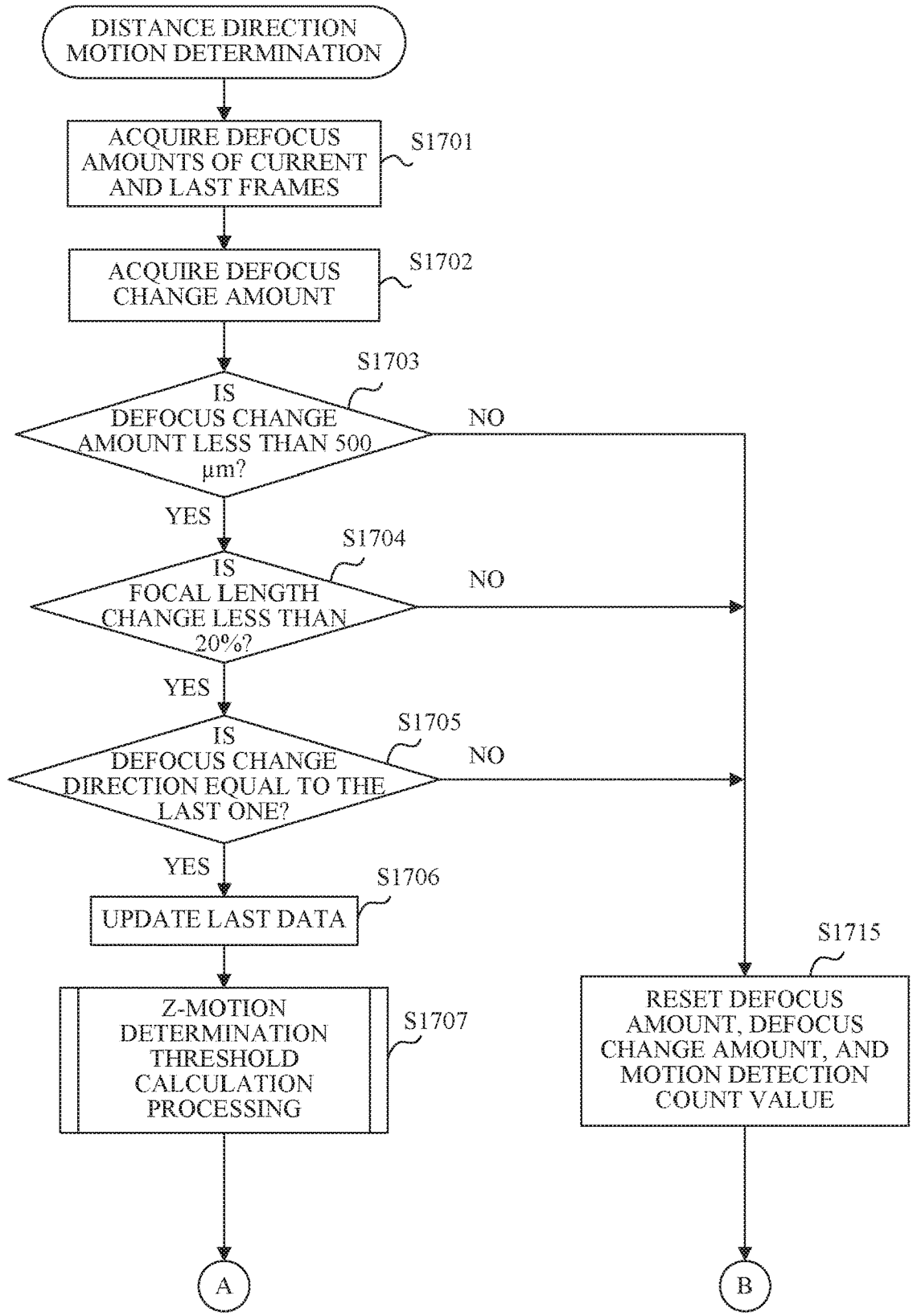
FIGS. 17A and 17B are flowcharts showing a distance direction motion determination.
Figure 17B:
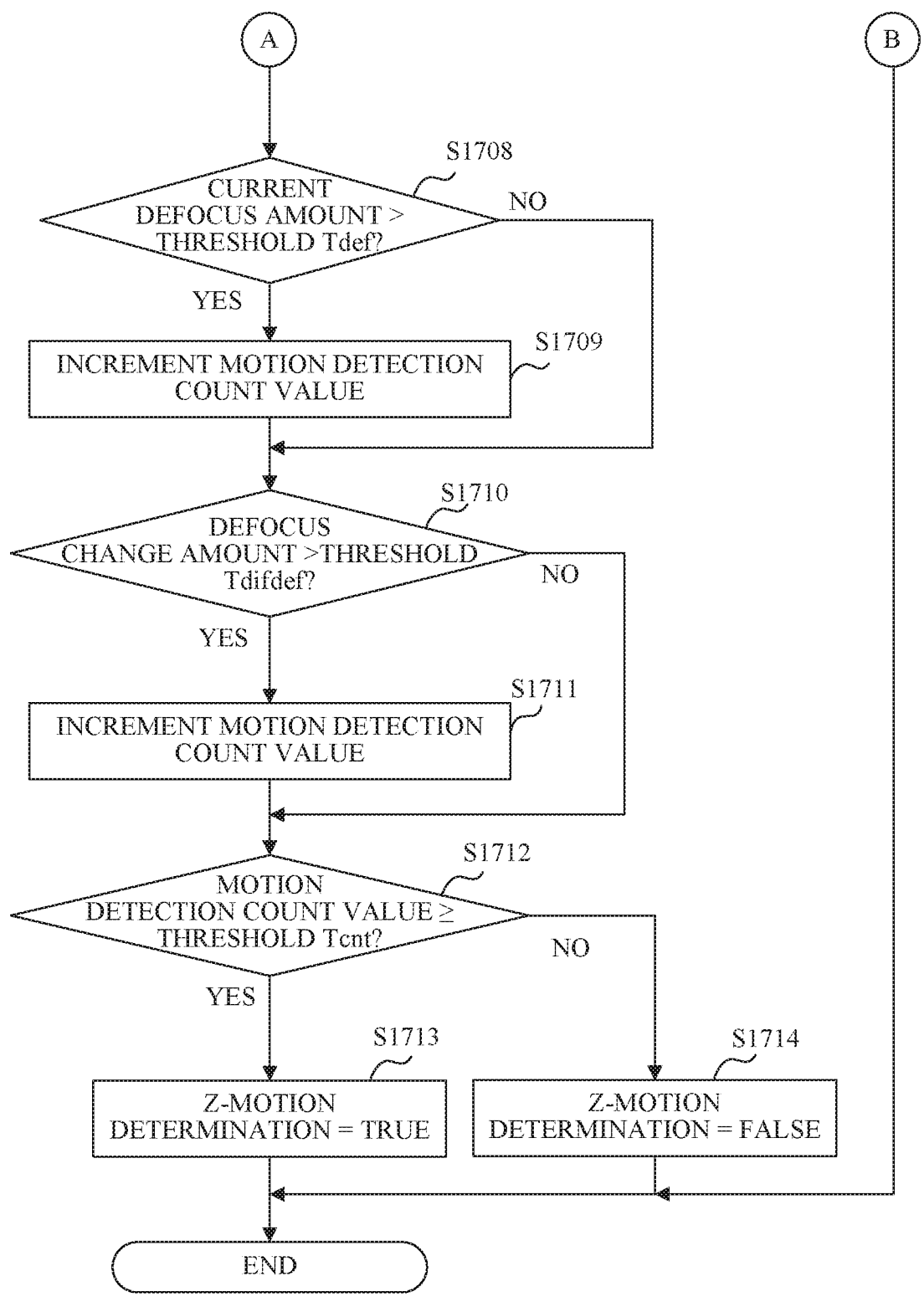

Referring now to FIGS. 17A and 17B, a description will be given of the distance direction motion determination. FIGS. 17A and 17B are flowcharts showing the distance direction motion determination.

In the step S1701, the camera controller 212 acquires the defocus amount in the current frame and the defocus amount in the last frame (it is set to 0 for the 0th frame).

In the step S1702, the camera controller 212 calculates a defocus change amount based on the last and current defocus amounts acquired in the step S1701.

In the step S1703, the camera controller 212 determines whether the defocus change amount is less than 500 μm. If the defocus change amount is less than 500 μm, the flow proceeds to the step S1704. On the other hand, if the defocus change amount is 500 μm or more, a different object may be captured due to crossing or an erroneous defocus calculation may be made, and the flow proceeds to the step S1715.

In the step S1704, the camera controller 212 determines whether a focal length change is less than 20%. If the change in the focal length is less than 20%, the flow moves to the step S1705. On the other hand, if the change in the focal length is 20% or more, the flow moves to the step S1715 by determining that it is not a motion of the object because the result such as the defocus change depends on the change in the focal length.

In the step S1705, the camera controller 212 determines whether the current defocus changing direction is the same as the last one. If the current defocus changing direction is the same as the last one, the flow moves to the step S1706. On the other hand, if the current defocus changing direction is not the same as the last one, this is highly likely caused by the noises of the defocus detection result or the object that has reversed, and thus the flow proceeds to the step S1715.

In the step S1706, the camera controller 212 updates the last data (the last defocus amount and the last defocus changing amount) with the current data (the current defocus amount and the current defocus changing amount).

In the step S1707, the camera controller 212 performs the Z-motion determination threshold calculation processing. There are three thresholds used for the Z motion determination: defocus changing threshold Tdef, defocus changing amount threshold Tdifdef, and motion count value Tcnt for counting how many times the motion has continued.

In the step S1708, the camera controller 212 determines whether the current defocus amount is larger than the threshold Tdef. If the current defocus amount is larger than the threshold Tdef, the flow proceeds to the step S1709, and if the current defocus amount is smaller than the threshold Tdef, the flow proceeds to the step S1710. When the current defocus amount is equal to the threshold Tdef, which step is to proceed is arbitrary.

In the step S1709, the camera controller 212 increments the motion detection count value.

In the step S1710, the camera controller 212 determines whether the defocus amount is larger than the threshold Tdifdef. If the defocus change amount is larger than the threshold Tdifdef, the flow proceeds to the step S1711. If the defocus change amount is smaller than the threshold Tdifdef, the flow proceeds to the step S1712. When the defocus change amount is equal to the threshold Tdifdef, which step is to proceed is arbitrary.

In the step S1711, the camera controller 212 increments the motion detection count value. In this embodiment, the defocus amount and the defocus change amount are counted independently. Therefore, when the defocus amount and the defocus change amount do not exceed the threshold Tdef and the threshold Tdifdef, respectively, the flow proceeds to the step S1712 without incrementing the motion detection count value.

In the step S1712, the camera controller 212 determines whether the motion detection count value is equal to or larger than the threshold Tcnt. When the motion detection count value is equal to or larger than the threshold Tcnt, the flow proceeds to the step S1713, and when the motion detection count value is smaller than the threshold Tcnt, the flow proceeds to the step S1714.

In the step S1713, the camera controller 212 returns the Z-motion determination result as TRUE.

In the step S1714, the camera controller 212 returns the Z-motion determination result as FALSE.

In the step S1715, the camera controller 212 resets the defocus amount, the defocus changing amount, and the motion detection count value.

In this embodiment, unless the resetting condition is satisfied (becoming 0), the motion detection count value is carried over to the next frame and detected as the motion over several frames.

Figure 18:
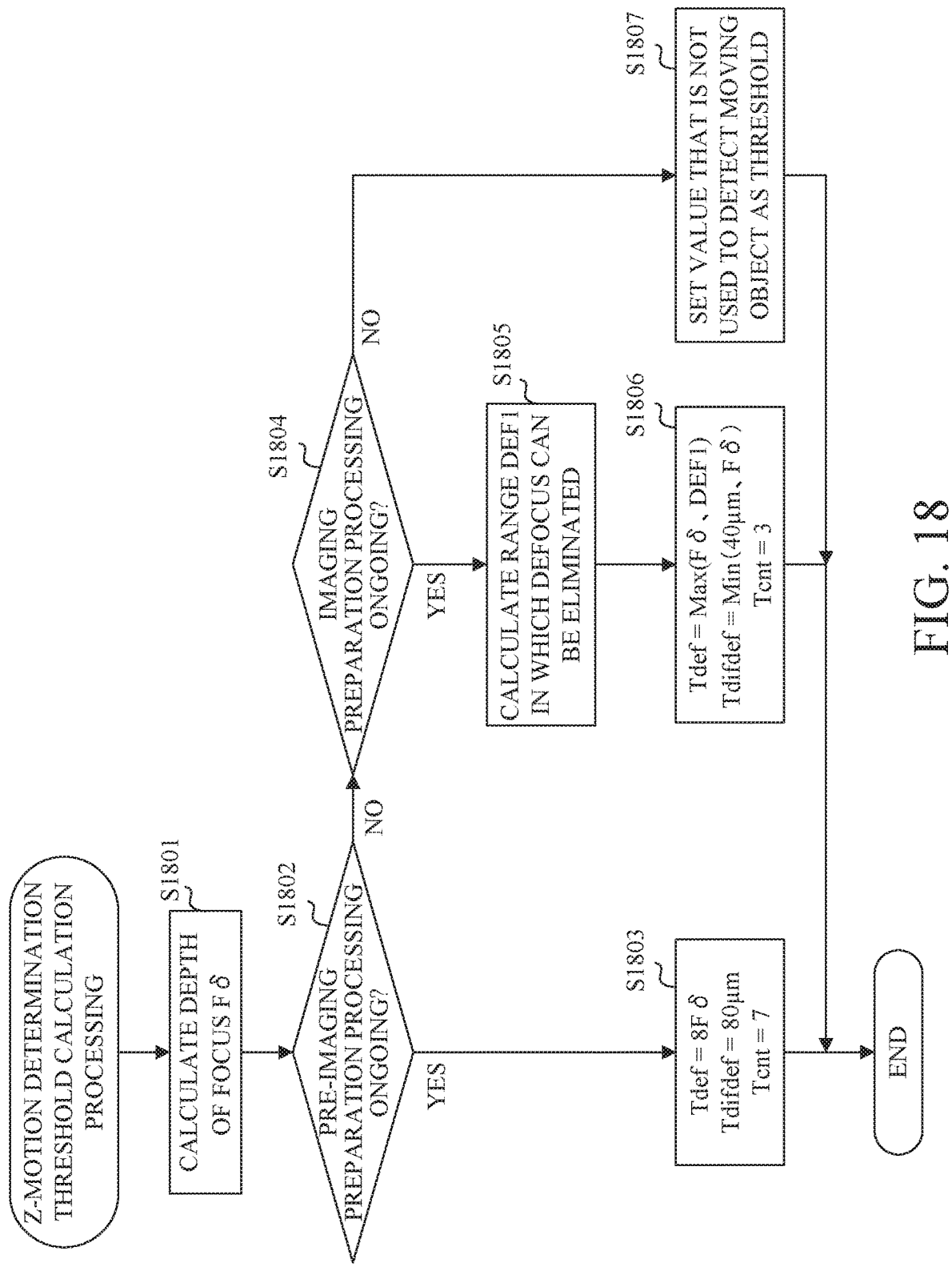
FIG. 18 is a flowchart showing a Z motion determination threshold calculation processing.

Referring now to FIG. 18, a description will be given of the Z-motion determination threshold calculation processing in the step S1707 in FIG. 17A. FIG. 18 is a flowchart showing the Z-motion determination threshold calculation processing.

In the step S1801, the camera controller 212 calculates the depth of focus Fδ using the permissible circle of confusion of the camera system and the F-number (aperture value) in the setting.

In the step S1802, the camera controller 212 determines whether or not the pre-imaging preparation processing is ongoing. If the pre-imaging preparation processing is ongoing, the flow moves to the step S1803. If the pre-imaging processing is not being performed, the flow moves to the step S1804.

In the step S1803, the camera controller 212 sets the threshold Tdef to a fixed value of eight times as large as the depth of focus (8Fδ), the threshold Tdifdef to 80 µm, and the threshold Tcnt to a predefined fixed value. This depends on the specific condition of the lens unit 10 being used, and the threshold Tdef may be experimentally determined so as not to reach a defocus state where the object detection (for example, face detection) is unavailable. The threshold Tdifdef may be experimentally determined in advance under a condition having a large change in the image plane movement as the object moves based on the relationship between the focal length and the object distance. The threshold Tcnt is a condition used when the motion is relatively large and continuous. The threshold before the imaging preparation is generally set by giving priority to framing of the camera system without emphasizing the distance direction at the stage before the imaging preparation.

In the step S1804, the camera controller 212 determines whether or not the imaging preparation processing is ongoing. If the imaging preparation processing is ongoing, the flow proceeds to the step S1805. If the imaging preparation processing is not being performed, the flow proceeds to step S1807.

In the step S1805, the camera controller 212 calculates range DEF1 in which the defocus can be eliminated by driving the focus lens until the next frame is read. For example, when a frame is read at 60 fps, a range for driving the focus lens is calculated within 16.6 ms. When the driving amount of the focus lens 103 is determined, the image plane moving amount can be calculated from the characteristic of the lens unit 10.

In the step S1806, the camera controller 212 sets the threshold Tdef to a larger one of the depth of focus (Fδ) and the range DEF1. In addition, the camera controller 212 sets the threshold Tdifdef to a smaller one of a value of 40 µm, which is half of the value set in the step S1803, and the depth of focus Fδ. Further, the camera controller 212 sets the threshold Tcnt to 3. The threshold during the imaging preparation is generally set so as to detect the motion by giving the priority to the motion in the distance direction in preparation for the next imaging as the imaging preparation.

In the step S1807, the camera controller 212 sets a value used when no motion is detected, to each threshold.

As described above, the configuration according to this embodiment can realize stable focusing.

This embodiment has described the camera operation where the motion determination is valid, but there may be a control that does not determine the motion.

Second Embodiment

The motion may be detected and the servo mode may be set when the object position changes or the distance (defocus) changes in the focus detecting area. In this case, even if the distance relationship with the object is maintained after the object is focused in the one-shot mode, the mode is switched to the servo mode when the user moves the camera so as to adjust the composition, and thus the focus cannot be made stable.

Accordingly, after the object is focused in the one-shot mode, this embodiment tracks the object, detects its motion only based on a change of the tracked object in the optical axis direction, and switches the mode to the servo mode based on the detection result. Thereby, this embodiment can provide a stable focusing function by properly switching the AF operation only by the motion of the object to be imaged without being affected by panning or framing operation by the user.

Referring now to the drawings, a description will be given of a camera system according to this embodiment, but FIGS. 1 to 9, 11 to 12, and 15A to 15C in the first embodiment are similarly used for this embodiment and a description thereof will be omitted.

Figure 19:
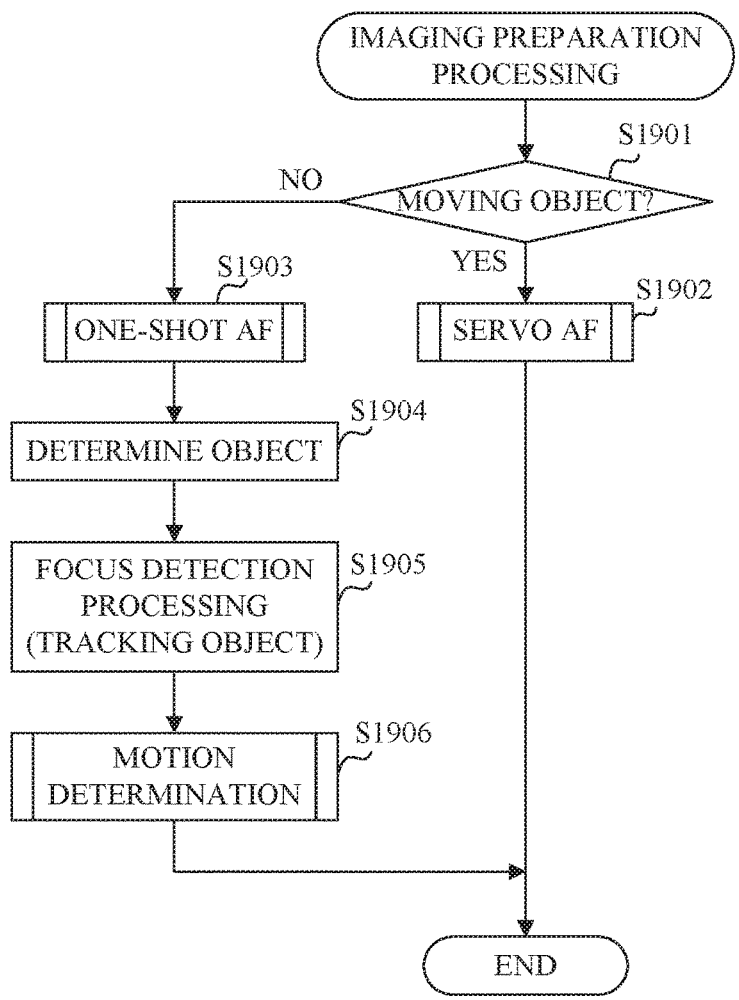
FIG. 19 is a flowchart showing imaging preparation processing according to a second embodiment.
Figure 20A:
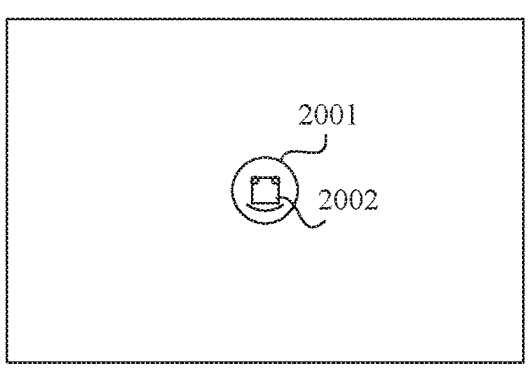
FIGS. 20A and 20B illustrate a movement of an object on an image sensor according to the second embodiment.
Figure 20B:
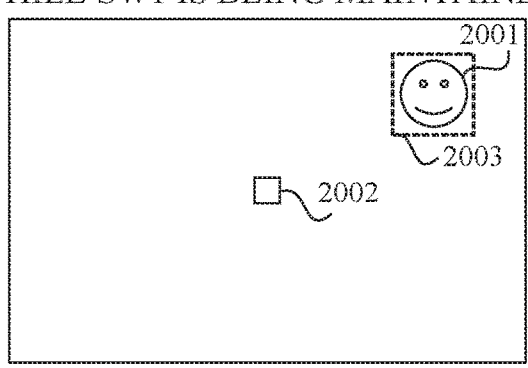

A description will now be given of the imaging preparation processing and the motion determination according to this embodiment. FIG. 19 is a flowchart showing the imaging preparation processing. FIG. 20A illustrates a relationship between an object 2001 and a focus detecting area 2002 when the object is focused by the one-shot AF. FIG. 20B illustrates that the object 2001 has moved on the image sensor 201 while the state of the SW1 continues after the object is focused by the one-shot AF. In FIG. 20B, a tracking area 2003 enclosed by a dotted line corresponds to the object 2001.

Processing from the step S1901 to the step S1903 is the same as that from the step S1001 to the step S1003 in FIG. 10 in the first embodiment, and a description thereof will be omitted.

In the step S1904, the camera controller 212 determines the tracking object. In the example in FIGS. 20A and 20B, the processing ends after the object 2001 is focused. The determined object may be automatically selected by the camera system or may be selected by the user via the camera operation unit 213. In the description of this embodiment, the object 2001 automatically selected by the camera system is determined as the tracking object.

In the step S1905, the camera controller 212 performs focus detection processing. Since the focus detection processing in this step is performed for the tracking object determined in the step S1904, like the focus detecting area 2002 and the tracking area 2003 in FIG. 21B, it does not necessarily accord with the area for which the focus detection processing is performed during the one-shot AF.

In the step S1906, the camera controller 212 determines a motion using the result of the focus detection processing in the step S1905.

Figure 21:
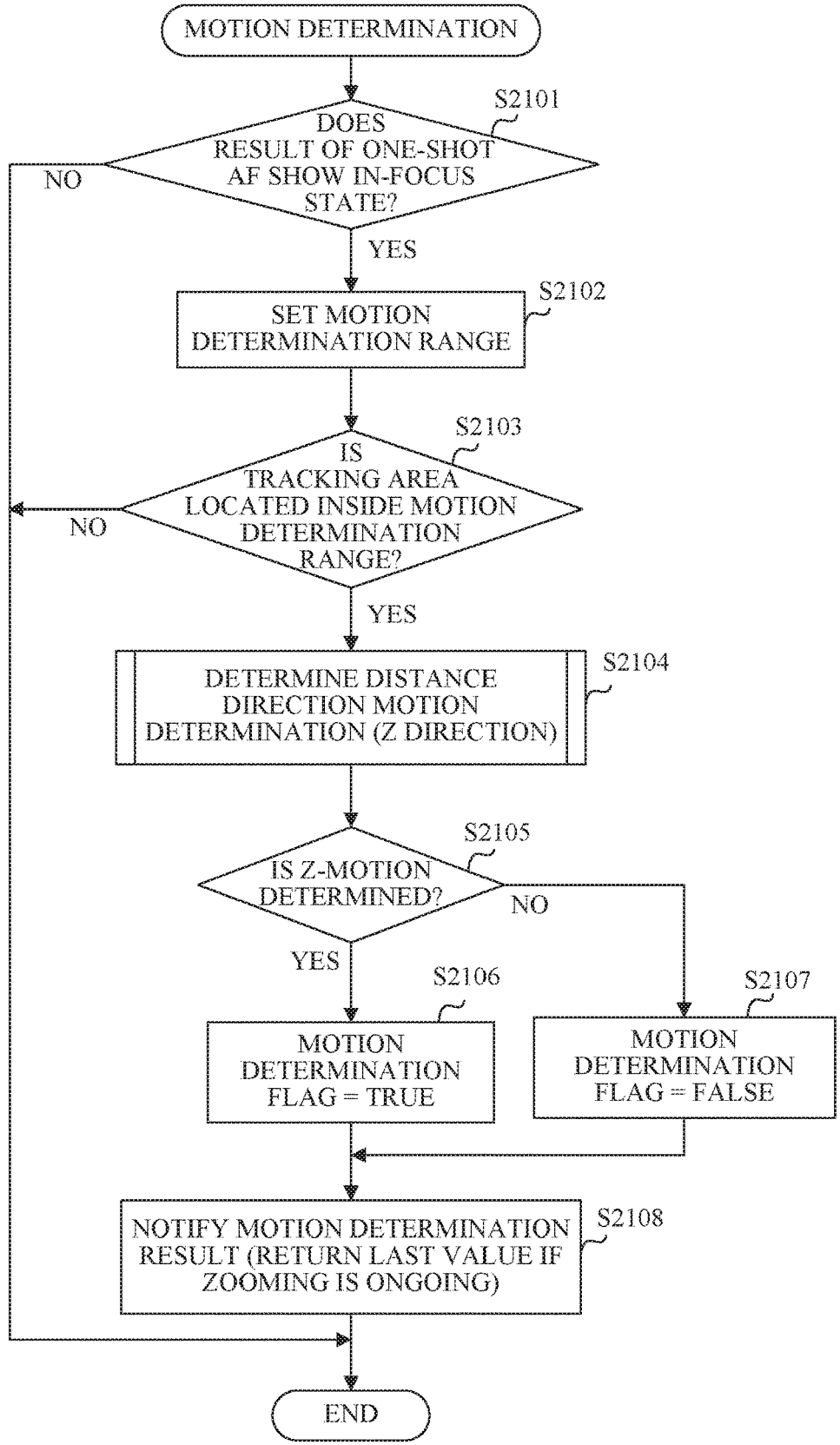
FIG. 21 is a flowchart showing a motion determination according to the second embodiment.

Referring now to FIG. 21, a description will be given of the motion determination in the step S1906 in FIG. 19. FIG. 21 is a flowchart showing the motion determination in the step S1906 in FIG. 19.

In the step S2101, the camera controller 212 determines whether the result of the one-shot AF performed in the step S1903 in FIG. 19 is in focus. If the result of the one-shot AF is in focus, the flow moves to the step S2102. If the result of the one-shot AF is out of focus, the flow ends.

In the step S2102, the camera controller 212 sets a motion determination range for determining whether the object is a moving object. The motion determination range can be changed depending on at least one of the AF mode, the size, distance, and type of the object, and a control state of a mechanism that suppresses changes in the optical axis such as the image stabilization.

In the step S2103, the camera controller 212 determines whether the tracking area is located inside the motion determination range. If the tracking area is located inside the motion determination range, the flow moves to the step S2104. If the tracking area is located outside the motion determination range, the processing ends. This embodiment determines whether or not all the tracking areas are located inside the motion determination range, but it may be determined whether at least part of the tracking area is located inside the motion determination range.

In the step S2104, the camera controller 212 performs a distance direction motion determination according to the flowcharts of FIGS. 17A and 17B.

In the step S2105, the camera controller 212 determines whether the Z-motion has been determined. When the motion is determined, the flow proceeds to the step S2106, and when no motion is determined, the flow proceeds to the step S2107.

Processing from the step S2106 to the step S2108 is the same as processing from the step S1304 to the step S1306 in FIG. 13, and a description thereof will be omitted.

As described above, this embodiment performs the switching determination in the tracking area based on whether or not the object is the moving object after the one-shot AF, and the motion determination only in the Z direction. Therefore, even if the user operates panning or framing after the object is focused by the first release switch SW1, the focus can be fixed unless the distance relationship with the object changes. When the distance relationship with the object changes, the mode can be quickly switched to the servo mode.

Figure 22A:
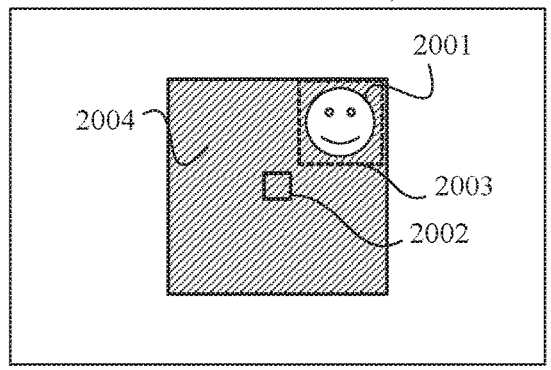
FIGS. 22A and 22B explain a motion determination range according to the second embodiment.
Figure 22B:
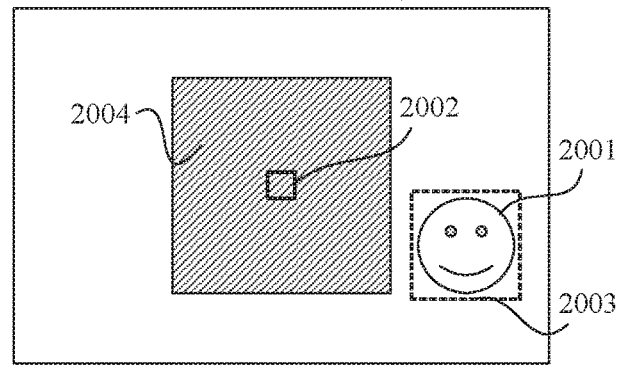

Referring now to FIGS. 22A and 22B, a description will be given of the setting of the motion determination range in the step S2102 in FIG. 21. FIGS. 22A and 22B explain the motion determination range. FIGS. 22A and 22B illustrate in-focus state while the first release switch SW1 is being pressed (while the first release switch SW1 is maintained) after the in-focus state in FIG. 20A. In FIG. 22A, the tracking area 2003 is located inside the motion determination range 2004, and thus when the motion determiner 2127 determines that the object is the moving object, the AF control switching unit 2124 switches the mode to servo AF. In FIG. 22B, the tracking area 2003 is located outside the motion determination range 2004, and even if the object 2001 changes in the Z direction, the motion is not determined by the motion determiner 2127 and the AF control switching unit 2124 does not switch the mode to servo AF.

Figure 23A:
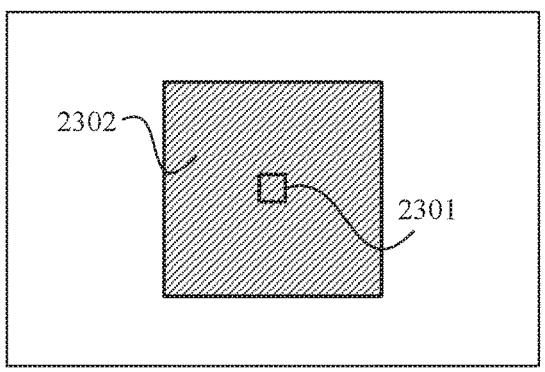
FIGS. 23A to 23D explain a variation of the motion determination range according to the second embodiment.
Figure 23B:
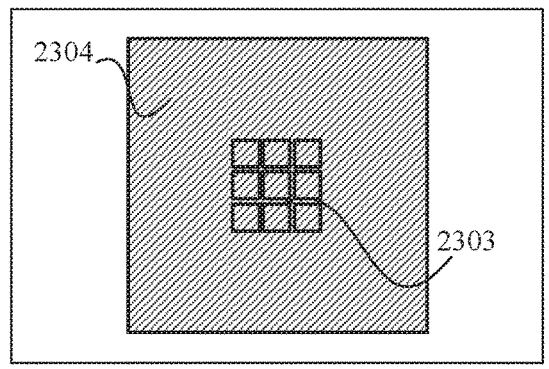
Figure 23C:
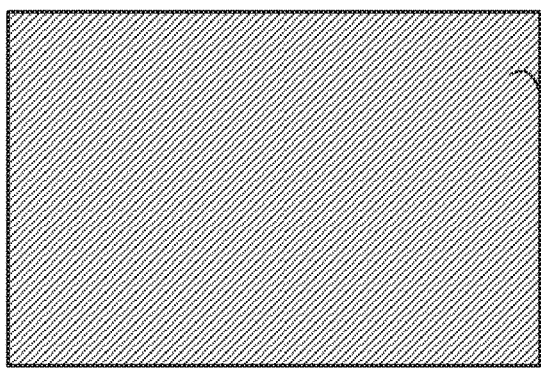
Figure 23D:
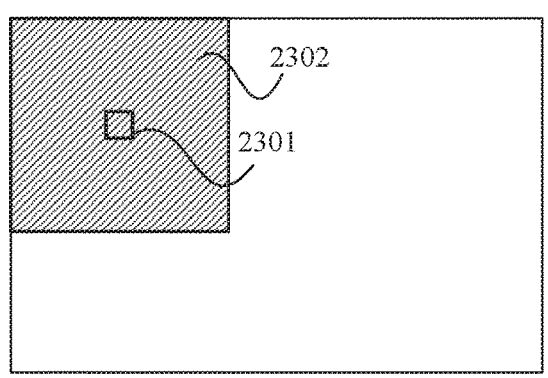

Referring now to FIGS. 23A to 23D, a description will be given of a variation of the motion determination range due to the difference in the AF mode. FIGS. 23A to 23D explain the variation of the motion determination range. Many cameras have a AF mode (focus detection method) in which at least one of a focus detection range and a target is different, such as a one-point AF mode using one focus detecting area, a zone AF mode using a plurality of focus detecting areas, and an automatic selection mode for performing the focus detection on the entire screen. For example, the one-point AF mode in FIG. 23A uses a focus detecting area 2301 and a motion determination range 2302. The zone AF mode in FIG. 23B uses a focus detecting area 2303 including nine rectangular areas and a motion determination area 2204 wider than the motion determination range of the one-point AF mode. The automatic selection mode in FIG. 23C uses a motion determination area 2305 over the entire screen since the focus detection is performed for the entire screen. As illustrated in FIG. 23D, it is possible to determine the motion determination range 2302 based on the position of the focus detecting area 2301. Thereby, the motion detection can correspond to the range in which the user needs the focus detection.

Referring now to FIGS. 24A to 24D, a description will be given of another variation of the motion determination range based on the size, distance, and type of the tracking object. FIGS. 24A to 24D explain the variation of the motion determination range. In any one of FIGS. 24A to 24D, a description will be given on the assumption that the one-point AF mode is set, the focus detecting area is located at the center of the image (screen), and the in-focus state is obtained by the one-shot AF.

Figure 24A:
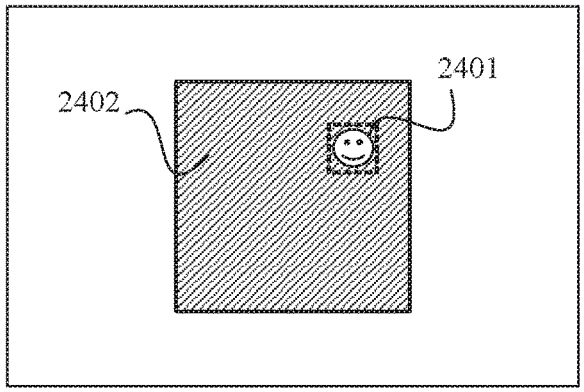
FIGS. 24A to 24D explain another variation of the motion determination range according to the second embodiment.
Figure 24B:
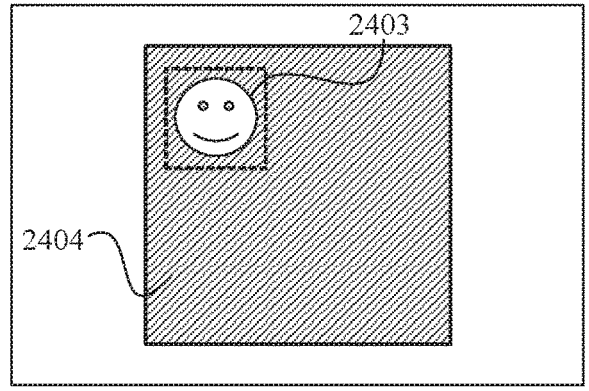

Referring now to FIGS. 24A and 24B, a description will be given of the variation of the motion determination range using the differences in size and distance. Of the object 2401 and the object 2403, the object 2403 is larger on the screen. Conceivably, this may occur when that object is simply larger or when the objects have the same sizes but that object is closer. Even when the motion amount of the object and the motion amount of the camera system are the same, the shorter object distance provides a larger motion amount on the screen. Therefore, a proper motion determination range can be set according to the size and the distance of the object by multiplying it by a coefficient $\alpha_{size}$ proportional to the object size or dividing it by a coefficient $\gamma_{distance}$ proportional to the object distance. In FIGS. 24A and 24B, the motion determination range 2404 is set wider than the motion determination range 2402. While the proper motion determination range can be set only by dividing it by the coefficient $\gamma_{distance}$, there may be some restrictions, such as a dedicated unit required to obtain the object distance, and low detection accuracy. On the other hand, since the object size information that can be obtained once the object is detected, no dedicated unit is necessary and its detection accuracy is higher than the object distance. Use of the coefficient $\alpha_{size}$ is more suitable for the condition.

Figure 24C:
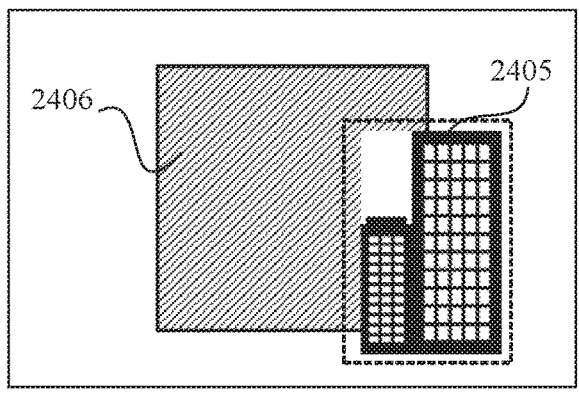
Figure 24D:
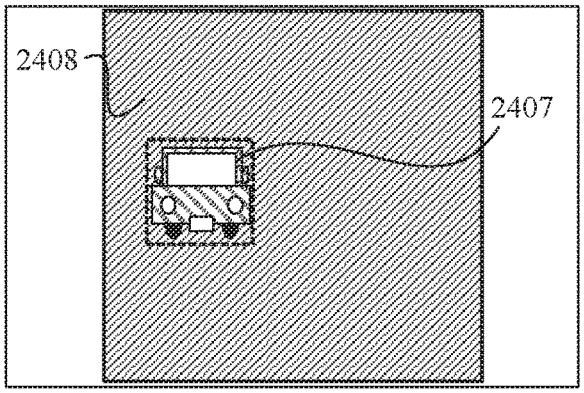

Referring now to FIGS. 24C and 24D, a description will be given of the variation of the motion determination range using the type of the object. In FIG. 24C, a building is selected as a tracking object 2405. In FIG. 24D, a car is selected as a tracking object 2407. When the building is selected as the tracking object 2405, the building does not normally move and thus any movements from the tracking start point are highly likely caused by the user's framing or the like. Also, any changes of the distance direction are highly likely to be caused by the intentional change of the user and thus switching to the servo AF is usually unnecessary. The same may be applied to the thing or plant installed by a person other than the building.

On the other hand, when the car is selected as the tracking object 2407, its moving speed is faster than the moving speed of the person or the like and thus it is very difficult to keep it in the same area on the screen depending on the framing technique by the user. Thus, setting a wider motion determination range can provide a more appropriate motion determination. Conceivably, the motion determination range needs to be expanded for any high-speed vehicles and animals that show unpredictable motions, other than the car.

As described above, the motion determination range can be properly set according to the object type by multiplying it by a coefficient $\beta_{type}$ determined by the object type. As an example of the coefficient $\beta_{type}$ where it is set to 1 as a reference for a person, it may set to 0.5 for a building and to 1.3 for a car or the like. Therefore, even when the tracking object 2405 is larger than the tracking object 2407 as in FIGS. 24C and 24D, the motion determination range 2406 may be narrower than the motion determination range 2308 depending on the object type.

From the above, the motion determination range Area, which is a ratio occupying on the screen, can be calculated by the following expression (7) using reference value Area$_{Base}$ of the motion determination range determined by the AF mode. The reference value Area$_{Base}$ is, for example, 30% in the one-point AF mode, 60% in the zone AF mode, and 100% in the automatic selection mode.

$$\text{Area}=\text{Area}_{base} \times \alpha_{size} \times \beta_{Type} / \gamma_{distance} \quad (7)$$

Similar to the motion determination range, in the Z-direction motion determination threshold calculation processing in S707 in FIG. 17, the threshold Th may be calculated by the following expression (8) in consideration of the size, distance, and type of the tracking object.

$$\text{Th}=\text{Th}_{base} \times \alpha_{size} \times \beta_{Type} / \gamma_{distance} \quad (8)$$

When the focus detection apparatus has a suppressor 108 for the optical axis shift, the motion determination range Area and the motion determination threshold Th can be calculated in the following expressions (9) and (10) by dividing them by the control state or the coefficient δ proportional to the image stabilization amount.

$$\text{Area}=\text{Area}_{base} \times \alpha_{size} \times \beta_{Type} / (\gamma_{distance} \times \delta) \quad (9)$$

$$\text{Th}=\text{Th}_{base} \times \alpha_{size} \times \beta_{Type} / (\gamma_{distance} \times \delta) \quad (10)$$

The suppressor 108 for the optical axis shift includes a so-called in-lens image stabilization control in the image stabilization mechanism in the lens unit, a so-called in-camera image stabilization control that shifts the image sensor, and an electronic image stabilization control that shifts an area read out of the image sensor according to an optical axis shift amount.

This embodiment has discussed an example that switches the motion determination range and the motion determination threshold when the motion determination range is set for the first time after the one-shot AF ends, but the present invention is not limited to this embodiment. For example, for the element other than the reference point of the motion determination range, the motion determination range and the motion determination threshold may be updated every S2102 in FIG. 21 or depending on the state of the object while SW1 is being maintained and the control state of the camera.

As described above, the configuration according to this embodiment can realize stable focusing.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-085658, filed on Apr. 26, 2019, which is hereby incorporated by reference herein in its entirety.

What is claimed is:

1. A focusing apparatus comprising:
at least one processor; and
at least one memory coupled to the at least one processor storing instructions that, when executed by the at least one processor, cause the at least one processor to function as a determination unit and a focusing unit,
wherein the determination unit configured to determine whether a subject is a moving subject,
wherein the focusing unit configured to control driving of a focus lens so that focus is adjusted to the subject,
wherein the determination unit determines whether the subject is the moving subject, using a first threshold before an operation of an operation unit, and using a second threshold different from the first threshold after the operation of the operation unit.

2. The focusing apparatus according to claim 1, wherein the determination unit determines that the subject is the moving subject based on at least one of a case where detecting a motion of the subject in a direction orthogonal to an optical axis based on a change in an imaging signal, and a case where the motion of the subject in the optical axis based on a change in a focus detecting signal.

3. The focusing apparatus according to claim 2, wherein the first threshold includes a third threshold used to detect the motion of the subject in the direction orthogonal to the optical axis, and a fourth threshold used to detect the motion of the subject in the optical axis, and
wherein the second threshold includes a fifth threshold used to detect the motion of the subject in the direction orthogonal to the optical axis and larger than the third threshold, and a sixth threshold used to detect the motion of the subject in the optical axis and smaller than the fourth threshold.

4. The focusing apparatus according to claim 1, wherein the determination unit does not determine whether the subject is the moving subject when first focus adjustment that continuously performs focusing is performed and a result of a second focus adjustment that performs focusing once shows an out-of-focus state.

5. The focusing apparatus according to claim 1, wherein the determination unit sets a determination range used to determine whether the subject is the moving subject, and does not determine whether the subject is the moving subject when the subject is located outside the determination range.

6. The focusing apparatus according to claim 5, wherein the determination unit sets the determination range for each of a plurality of focus detection methods that are different from each other in at least one of a focus detecting range or a focus detection target.

7. The focusing apparatus according to claim 5, wherein the determination unit sets the determination range based on a position of a focus detecting area.

8. The focusing apparatus according to claim 5, wherein the determination unit sets the determination range based on at least one of a size, a distance, and a type of the subject.

9. The focusing apparatus according to claim 5, wherein the determination unit sets the second threshold based on at least one of a size, a distance, and a type of the subject.

10. The focusing apparatus according to claim 5, wherein the determination unit sets the determination range according to a control state of a suppresser configured to suppress a change of an optical axis relative to an optical system.

11. The focusing apparatus according to claim 5, wherein the determination unit sets the second threshold according to a control state of a suppresser configured to suppress a change of an optical axis relative to an optical system.

12. An image pickup apparatus comprising:
the focusing apparatus according to claim 1; and
an image sensor configured to photoelectrically convert a subject image formed through an optical system including the focus lens configured to move along an optical axis and to output an imaging signal and a focus detecting signal.

13. A focusing method comprising:
a first determining step of determining whether a subject is a moving subject using a first threshold;
a second determining step of determining whether the subject is the moving subject using a second threshold different from the first threshold after the operation of the operation unit; and
an adjusting step of controlling driving of a focus lens so that focus is adjusted to the subject.

14. A non-transitory computer readable storage medium storing a program for causing a computer to execute the focusing method according to claim 13.

15. The focusing apparatus according to claim 1, wherein the determination unit configured to determine whether the subject is the moving subject based on changes in an imaging signal and a focus detecting signal generated by photoelectrically converting a subject image formed through an optical system including the focus lens configured to move along an optical axis.

16. The focusing apparatus according to claim 1, wherein the focusing unit performs first focus adjustment that continuously performs focusing when the determination unit determines that the subject is the moving subject before the operation of the operation unit, and performs the first focus adjustment when the determination unit determines that the subject is the moving subject after performing second focus adjustment that performs the focusing once in response to the operation of the operation unit.

17. The focusing apparatus according to claim 1, wherein the operation of the operation unit is a half-pressing operation on an auto focus (AF) instruction operation button performed by a user.

18. The focusing apparatus according to claim 1, wherein when the determination unit determines whether the subject is the moving subject, a mode is set to (a) a mode that performs focus adjustment once in response to the operation of the operation unit or (b) a mode that continuously performs focus adjustment in response to a motion of the subject.

* * * * *